(12) United States Patent
Do

(10) Patent No.: US 8,014,083 B2
(45) Date of Patent: *Sep. 6, 2011

(54) IMAGING LENS

(75) Inventor: Satoshi Do, Saitama (JP)

(73) Assignees: Satoshi Do, Saitama (JP); Milestone Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/447,064

(22) PCT Filed: Aug. 29, 2007

(86) PCT No.: PCT/JP2007/066786
§ 371 (c)(1),
(2), (4) Date: Apr. 24, 2009

(87) PCT Pub. No.: WO2008/142809
PCT Pub. Date: Nov. 27, 2008

(65) Prior Publication Data
US 2010/0118416 A1 May 13, 2010

(30) Foreign Application Priority Data
May 17, 2007 (JP) .................................. 2007-131926

(51) Int. Cl.
G02B 9/12 (2006.01)
G02B 3/02 (2006.01)

(52) U.S. Cl. ....................................... 359/784; 359/716

(58) Field of Classification Search .................. 359/716, 359/784, 797, 785–792
See application file for complete search history.

(56) References Cited

U.S. PATENT DOCUMENTS
6,498,689 B2  12/2002  Katsuma
(Continued)

FOREIGN PATENT DOCUMENTS
JP  2001-242308  9/2001
(Continued)

OTHER PUBLICATIONS
Japanese International Search Report dated Oct. 2, 2007.
(Continued)

Primary Examiner — Jack Dinh
(74) Attorney, Agent, or Firm — Venable LLP; Jeffri A. Kaminski; Yao Wang

(57) ABSTRACT

The present invention is an imaging lens of which optical performance does not deteriorate even in a high temperature environment, various aberrations are well corrected, optical length is short, and back focus is sufficiently secured, the imaging lens comprising a first junction type compound lens, an aperture stop S, a second junction type compound lens, and a third junction type compound lens, which are arranged in this sequence from an object side to an image side. The first junction type compound lens comprises a first lens $L_1$, a second lens $L_2$ and a third lens $L_3$ arranged in this sequence from the object side to the image side, the second junction type compound lens comprises a fourth lens $L_4$, a fifth lens $L_5$ and a sixth lens $L_6$ arranged in this sequence from the object side to the image side, and the third junction type compound lens comprises a seventh lens $L_7$, an eighth lens $L_8$ and a ninth lens $L_9$ arranged in this sequence from the object side to the image side. The first lens, the third lens, the fourth lens, the sixth lens, the seventh lens and the ninth lens are formed of a curable resin material, and the second lens, the fifth lens and the eighth lens are formed of a high softening temperature optical glass material.

21 Claims, 14 Drawing Sheets

U.S. PATENT DOCUMENTS

| | | |
|---|---|---|
| 6,551,530 B2 | 4/2003 | Koizumi et al. |
| 6,560,037 B2 | 5/2003 | Dou |
| 6,862,804 B2 | 3/2005 | Nishio et al. |
| 6,985,309 B2 * | 1/2006 | Shinohara ............ 359/783 |
| 7,342,731 B2 | 3/2008 | Lee et al. |
| 7,656,593 B2 * | 2/2010 | Do .................... 359/784 |
| 2006/0050399 A1 | 3/2006 | Nakagawa |
| 2007/0014033 A1 | 1/2007 | Shinohara |

FOREIGN PATENT DOCUMENTS

| | | |
|---|---|---|
| JP | 2001-305309 | 10/2001 |
| JP | 2002-154169 | 5/2002 |
| JP | 2002-154170 | 5/2002 |
| JP | 2003-311757 | 11/2003 |
| JP | 2004-053834 | 2/2004 |
| JP | 2004-328474 | 11/2004 |
| JP | 2005-067999 | 3/2005 |
| JP | 2005-084273 | 3/2005 |
| JP | 2005-258329 | 9/2005 |
| JP | 2005-305938 | 11/2005 |
| JP | 2006-121079 | 5/2006 |
| JP | 2006-195053 | 7/2006 |
| JP | 2006-308669 | 11/2006 |
| JP | 2006-323365 | 11/2006 |

OTHER PUBLICATIONS

Japanese International Search Report dated Jul. 10, 2007, for PCT/JP2007/061875.

* cited by examiner

Back Focus

Optical Length

IMAGING LENS

TECHNICAL FIELD

The present invention relates to an imaging lens, and more particularly to an imaging lens that can be suitably mounted on a portable telephone or the like.

BACKGROUND ART

In a portable telephone with a built-in digital camera, an imaging lens is mounted on a printed circuit board. As a method for mounting an imaging lens on a printed circuit board, a reflow soldering processing is used. Hereafter the reflow soldering may simply be called "reflow". Reflow processing is a method for soldering an electronic component on a printed circuit board, by placing a solder ball in advance at a location where an electronic component is connected, placing the electronic component there, heating to melt the solder ball, then cooling the solder down.

Generally in mass production steps, a reflow step for performing reflow processing is used as a method for mounting electronic elements or such components as an imaging lens on a printed circuit board. If the reflow step is used, the mounting cost of components on a printed circuit board can be decreased, and manufacturing quality can be maintained at a predetermined level.

In the reflow step of the manufacturing steps of a portable telephone comprising an imaging lens, not only are electronic components arranged at predetermined positions on a printed circuit board, but also the imaging lens itself or a socket for installing the imaging lens is disposed on the printed circuit board.

The imaging lens installed in portable telephones are largely made of plastic in order to decrease the manufacturing cost, and to insure lens performance. Therefore a heat resistant socket component is used for installing an imaging lens in order to prevent thermal deformation of the imaging lens in a high temperature environment, which makes it impossible to maintain optical performance thereof.

In other words, in the reflow step, a heat resistant socket component for installing an imaging lens is mounted on the printed circuit board of the portable telephone, so that the imaging lens is not exposed to high temperature in the reflow step (e.g. see Patent Documents 1 to 3). However, using a heat resistant socket component for installing an imaging lens makes the manufacturing steps complicated, and increases the manufacturing cost, including the cost of this heat resistant socket.

A recent demand is that the optical performance of an imaging lens installed in a portable telephone does not deteriorate even if the portable telephone itself is placed in about a 150° C. high temperature environment, considering the case of the portable telephone being left in an automobile which temporarily becomes a high temperature environment. A conventional imaging lens made of plastic material cannot meet this demand.

In order to implement an imaging lens of which optical performance is maintained even in a high temperature environment, forming an imaging lens using a high softening temperature mold glass material is possible (e.g. see Patent Document 4). Since the temperature at which the high softening temperature mold glass material softens is several hundred degrees or more, the deterioration of optical performance of an imaging lens in a high temperature environment can be avoided, but at the moment, an imaging lens made of mold glass material is not very popular, because the manufacturing cost is very high.

In addition to the above mentioned thermal characteristics, an imaging lens installed in a portable telephone must satisfy the following conditions related to optical characteristics. One condition is that the optical length is short. The optical length refers to a distance from an entrance plane at an object side to an image formation plane (also called "image sensing plane") of the imaging lens. In other words, when a lens is designed, the ratio of the optical length to the composite focal distance of the imaging lens must be minimized. In the case of a portable telephone, for example, this optical length must at least be shorter than the thickness of the portable telephone unit.

On the other hand, a back focus, which is defined as a distance from the outgoing plane at the image side to the image sensing plane of the imaging lens, should be as long as possible. In other words, when the lens is designed, the ratio of the back focus to the focal distance must be maximized. This is because such components as a filter and a cover glass must be inserted between the imaging lens and the image sensing plane.

In addition to this, it is naturally demanded for the imaging lens that various aberrations are corrected to be small enough that the distortion of the image is not visually recognized, and that the integration density of the image sensing elements in minimal units (also called "pixels"), which are arranged in a matrix on the light receiving plane of a CCD (Charge Coupled Device) image sensor, is sufficiently satisfied. In other words, various aberrations of the imaging lens must be well corrected. Hereafter an image, of which various aberrations are well corrected, may be called a "good image".

Patent Document 1: Japanese Patent Application Laid-Open No. 2006-121079 (Patent No. 3799615)
Patent Document 2: Japanese Patent Application Laid-Open No. 2004-328474 (Patent No. 3915733)
Patent Document 3: Japanese Patent Application Laid-Open No. 2004-063787 (Patent No. 3755149)
Patent Document 4: Japanese Patent Application Laid-Open No. 2005-067999

DISCLOSURE OF THE INVENTION

Problems to be Solved by the Invention

With the foregoing in view, it is an object of the present invention to provide an imaging lens suitable for being installed in a portable telephone, and of which heat resistance is guaranteed and optical performances does not deteriorate, even in a high temperature environment of a reflow step, or even if the imaging lens is installed in a portable telephone and is temporarily placed in the highest temperature environment in the design specifications.

It is another object of the present invention to provide an imaging lens of which optical length is short enough to be installed in a portable telephone, back focus is long enough to insert such a component as a filter and a cover glass between the imaging lens and the image sensing plane, and with which a good image is acquired.

Means for Solving the Problems

To achieve the above objects, a first imaging lens of this invention comprises a first junction type compound lens, an aperture stop, a second junction type compound lens, and a third junction type compound lens, characterized in that the first junction type compound lens, the aperture stop, the second junction type compound lens, and the third junction type compound lens are arranged in this sequence from an object side to an image side.

The first junction type compound lens comprises a first lens, a second lens and a third lens arranged in this sequence from the object side to the image side, and the second junction type compound lens comprises a fourth lens, a fifth lens and a sixth lens arranged in this sequence from the object side to the image side, and the third junction type compound lens comprises a seventh lens, an eighth lens and a ninth lens arranged in this sequence from the object side to the image side.

The first lens, the third lens, the fourth lens, the sixth lens, the seventh lens and the ninth lens are formed of a curable resin material, and the second lens, the fifth lens and the eighth lens are formed of a high softening temperature optical glass material. The first lens and the second lens are indirectly bonded, the second lens and the third lens are indirectly bonded, the fourth and the fifth lens are indirectly bonded, the fifth lens and the sixth lens are indirectly bonded, the seventh lens and the eighth lens are indirectly bonded, and the eighth lens and the ninth lens are indirectly bonded.

Or the first lens, the second lens, the third lens, the fourth lens, the fifth lens, the sixth lens, the seventh lens, the eighth lens and the ninth lens are formed of a curable resin material. The first lens and the second lens are directly bonded or indirectly bonded, the second lens and the third lens are directly bonded or indirectly bonded, the fourth lens and the fifth lens are directly bonded or indirectly bonded, the fifth lens and the sixth lens are directly bonded or indirectly bonded, the seventh lens and the eighth lens are indirectly bonded, and the eighth lens and the ninth lens are directly bonded or indirectly bonded.

A second imaging lens of the present invention comprises an aperture stop (first stop), a first junction type compound lens, a second stop, a second junction type compound lens and a third junction type compound lens, characterized in that the aperture stop (first stop), the first junction type compound lens, the second stop, the second junction type compound lens and the third junction type compound lens are arranged in this sequence from an object side to an image side.

The first junction type compound lens comprises a first lens, a second lens, and a third lens arranged in this sequence from the object side to the image side, the second junction type compound lens comprises a fourth lens, a fifth lens and a sixth lens arranged in this sequence from the object side to the image side, and the third junction type compound lens comprises a seventh lens, an eighth lens and a ninth lens arranged in this sequence from the object side to the image side.

The first lens, the third lens, the fourth lens, the sixth lens, the seventh lens and the ninth lens are formed of a curable resin material, and the second lens, the fifth lens and the eighth lens are formed of a high softening temperature optical glass material. The first lens and the second lens are indirectly bonded, the second lens and the third lens are indirectly bonded, the fourth lens and the fifth lens are indirectly bonded, the fifth lens and the sixth lens are indirectly bonded, the seventh lens and the eighth lens are indirectly bonded, and the eighth lens and the ninth lens are indirectly bonded.

The curable resin material refers to both a thermosetting resin material and a UV-curable resin material. The high softening temperature optical glass material refers to such optical glass material as a high softening temperature mold glass material or boro-silicate glass.

Bonding in the case when the second lens, the fifth lens and the eighth lens are formed of a curable resin material will be described. In the description, the first junction type compound lens is used as an example. The cases of the second and third junction type compound lenses are also the same, so description thereof is omitted.

The bonding of the second lens formed of a curable resin material and the first lens or the third lens formed of a curable resin material is implemented as follows. A liquid type curable resin material is contacted to the second lens formed of the curable resin material, and the first lens or the third lens is bonded to the second lens by solidifying, that is by curing, this curable resin material. This bonding may be called "direct bonding" herein below. The second lens and the first lens or the third lens may be bonded by using an adhesive between the second lens and the first lens or the third lens. This bonding may be called "indirect bonding" herein below.

The bonding of the second lens formed of a high Softening temperature optical glass and the first lens or the third lens formed of a curable resin material, on the other hand, is performed by indirect bonding.

When the junction type compound lens is implemented by indirect bonding, whether it is the case of the second lens formed of a curable resin material or the case of the second lens formed of a high softening temperature optical glass, the reflection in the interface between the second lens and the first lens or the third lens can be decreased if the adhesive is selected so that the optical characteristics of the adhesive can be utilized, such as selecting an appropriate refractive index of the adhesive with respect to the refractive index of the second lens and the refractive index of the first or third lens.

If the coating processing is performed on the surface of the second lens facing the first lens or the third lens, and these lenses are bonded, whether adhesive is used to bond or not, the reflection in the interface with the first lens (or the third lens) can be decreased.

In the above mentioned first or second imaging lens, it is preferable to set settings so as to satisfy the following Conditions (1) to (12).

$$0 \leq |N_2 - N_1| \leq 0.1 \qquad (1)$$

$$0 \leq |N_2 - N_3| \leq 0.1 \qquad (2)$$

$$0 \leq v_2 - v_1 | \leq 30.0 \qquad (3)$$

$$0 \leq v_2 - v_3 | \leq 30.0 \qquad (4)$$

$$0 \leq |N_5 - N_4| \leq 0.1 \qquad (5)$$

$$0 \leq |N_5 - N_6| \leq 0.1 \qquad (6)$$

$$0 \leq |v_5 - v_4| \leq 30.0 \qquad (7)$$

$$0 \leq |v_5 - v_6| \leq 30.0 \qquad (8)$$

$$0 \leq |N_8 - N_7| \leq 0.1 \qquad (9)$$

$$0 \leq |N_8 - N_9| \leq 0.1 \qquad (10)$$

$$0 \leq |v_8 - v_7| \leq 30.0 \qquad (11)$$

$$0 \leq |v_8 - v_9| \leq 30.0 \qquad (12)$$

where
  $N_1$: refractive index of the first lens
  $N_2$: refractive index of the second lens
  $N_3$: refractive index of the third lens
  $v_1$: Abbe number of the first lens
  $v_2$: Abbe number of the second lens $v_3$: Abbe number of the third lens
$N_4$: refractive index of the fourth lens
$N_5$: refractive index of the fifth lens
$N_6$: refractive index of the sixth lens
$v_4$: Abbe number of the fourth lens
$v_5$: Abbe number of the fifth lens
$v_6$: Abbe number of the sixth lens
$N_7$: refractive index of the seventh lens
$N_8$: refractive index of the eighth lens
$N_9$: refractive index of the ninth lens
$v_7$: Abbe number of the seventh lens
$v_8$: Abbe number of the eighth lens
$v_9$: Abbe number of the ninth lens The shapes of the first to the ninth lenses of the above mentioned first and second imaging lenses are as follows.

The second lens, the fifth lens and the eighth lens can be optical-parallel plates. An optical-parallel plate normally is not referred to as a lens, but to simplify description, the optical-parallel plate may be included in a lens description, regarding this as a special case where the radius of curvature of the lens surface is infinite.

If the second lens, the fifth lens and the eighth lens are optical-parallel plates, the first lens can be a plano-convex lens where the object side face of the first lens is a convex surface facing the object side on a paraxial line, the third lens can be a plano-concave lens where the image side face of the third lens is a concave surface facing the image side on a paraxial line, the fourth lens can be a plano-concave lens where the object side face of the fourth lens is a concave surface facing the object side on a paraxial line, the sixth lens can be a plano-convex lens where the image side face of the sixth lens is a convex surface facing the image side on a paraxial line, the seventh lens can be a plano-convex lens where the object side face of the seventh lens is a convex surface facing the object side on a paraxial line, and the ninth lens can be a plano-concave lens where the image side face of the ninth lens is a concave surface facing the image side on a paraxial line.

The following is also possible if the second lens, the fifth lens and the eighth lens are optical-parallel plates. In other words, the first lens can be a plano-convex lens where the object side face of the first lens is a convex surface facing the object side on a parallel line, the third lens can be a plano-convex lens where the image side face of the third lens is a convex surface facing the image side on a paraxial line, the fourth lens can be a plano-concave lens where the object side face of the fourth lens is a concave surface facing the object side on a paraxial line, the sixth lens can be a plano-convex lens where the image side face of the sixth lens is a convex surface facing the image side on a paraxial line, the seventh lens can be a plano-convex lens where the object side face of the seventh lens is a convex surface facing the object side, and the ninth lens can be a plano-concave lens where the image side face of the ninth lens is a concave surface facing the image side on a paraxial line.

It is also possible that the second lens is a meniscus lens of which convex surface facing the object side, the first lens is a lens where the object side face of the first lens is a convex surface facing the object side on a paraxial line, the third lens is a lens where the image side face of the third lens is a concave surface facing the image side on a paraxial line, the fifth lens is a meniscus lens of which convex surface faces the image side, the fourth lens is a lens where the object side face of the fourth lens is a concave surface facing the object side on a paraxial line, the sixth lens is a lens where the image side face of the sixth lens is a convex surface facing the image side on a paraxial line, the eighth lens is a biconvex lens of which both side faces are convex surfaces, the seventh lens is a lens where the object side face of the seventh lens is a convex surface facing the object side on a paraxial line, and the ninth lens is a lens where the image side face of the ninth lens is a concave surface facing the image side on a paraxial line.

It is also possible that the second lens is a biconvex lens of which both side faces are convex surfaces, the first lens is a lens where the object side face of the first lens is a convex surface facing the object side on a paraxial line, the third lens is a lens where the image side face of the third lens is a convex surface facing the image side on a paraxial line, the fifth lens is a meniscus lens of which convex surface faces the image side, the fourth lens is a lens where the object side face of the fourth lens is a concave surface facing the object side on a paraxial line, the sixth lens is a lens where the image side face of the sixth lens is a convex surface facing the image side on a paraxial line, the eighth lens is a meniscus lens of which convex surface faces the image side, the seventh lens is a lens where the object side face of the seventh lens is a convex surface facing the object side on a paraxial line, and the ninth lens is a lens where the image side face of the ninth lens is a concave surface facing the image side on a paraxial line.

As mentioned above, the second lens, the fifth lens and the eighth lens can be an optical-parallel plate, meniscus lens or biconvex lens, but is not limited to these, but may be a concave lens, for example. The shapes of the second lens, the fifth lens and the eighth lens are determined by convenience in forming the first lens and third lens, the fourth lens and sixth lens, and the seventh lens and ninth lens, which are resin lenses formed on both sides of a respective lens, or by convenience in designing the imaging lens of the present invention.

In other words, if the second lens, the fifth lens and the eighth lens are implemented by a lens constructed by a curved surface, such as a meniscus lens, a convex lens or a concave lens, the bonding surface with a resin lens, which is formed on both sides of the second lens, fifth lens and eighth lens respectively, becomes wider compared with the case of implementing the lens by an optical-parallel plate, and bonding strength increases accordingly. Also the range of choices of the radius of curvature of the second lens, fifth lens and eighth lens, which is a design parameter to implement performance of the lens, including aberration, becomes wider, which makes designing of the imaging lens of this invention easier.

On the other hand, it becomes more difficult to prevent the entry of bubbles into the bonding interface when junction type compound lenses (the first, second and third junction type compound lenses) is fabricated, if the radius of curvature of the second lens, fifth lens and eighth lens is decreased (that is, if curvature thereof is increased). Also using such lens with a curved surface as a meniscus lens instead of an optical-parallel plate for the second lens, fifth lens and eighth lens, increases the manufacturing cost, compared with the case of using an optical-parallel plate.

To form the first and second imaging lenses of the present invention, it is preferable that the object side face of the first lens, the image side face of the third lens, the object side face of the fourth lens, the image side face of the sixth lens, the object side face of the seventh lens and the image side face of the ninth lens are aspherical.

It is also preferable that at least one surface out of both surfaces of the second lens, both surfaces of the fifth lens, and both surfaces of the eighth lens, a total of six surfaces, is coating-processed, the first lens and the second lens are indirectly bonded, the second lens and the third lens are indirectly bonded, the fourth lens and the fifth lens are indirectly bonded, the fifth lens and the sixth lens are indirectly bonded, the seventh lens and the eighth lens are indirectly bonded, and the eighth lens and the ninth lens are indirectly bonded.

To form the first and second imaging lenses of the present invention, it is preferable that the curable resin material, which is a material of the first lens, third lens, fourth lens, sixth lens, seventh lens and ninth lens, is a transparent curable silicone resin. "Transparent" here indicates that the light absorption of visible light is small (transparent) enough to have no influence on practical use.

EFFECT OF THE INVENTION

According to the first and second imaging lenses of the present invention, in the first junction type compound lens constituting the imaging lenses, the first and the third lenses, which are formed of a curable resin material, sandwich and are indirectly bonded to the second lens, which is formed of a high softening temperature optical glass material. In the second junction type compound lens, the fourth and the sixth lenses, which are formed of a curable resin material, sandwich and are indirectly bonded to the fifth lens, which is formed of a high softening temperature optical glass material. And in the third junction type compound lens, the seventh and the ninth lenses, which are formed of a curable resin material, sandwich and are indirectly bonded to the eighth lens, which is formed of a high softening temperature optical glass material.

In the first imaging lens of the present invention, the first junction type compound lens may be comprised of the first lens, the second lens and the third lens arranged in this sequence from the object side to the image side, where the first lens, the second lens and the third lens are formed of a curable resin material. The second junction type compound lens may be comprised of the fourth lens, the fifth lens and the sixth lens arranged in this sequence from the object side to the image side, where the fourth lens, the fifth lens and the sixth lens are formed of a curable resin material. And the third junction type compound lens may be comprised of the seventh lens, the eighth lens and the ninth lens arranged in this sequence from the object side to the image side, where the seventh lens, the eighth lens and the ninth lens are formed of a curable resin material. In this case, the first lens and the second lens are directly bonded or indirectly bonded, and the second lens and the third lens are directly bonded or indirectly bonded. The fourth lens and the fifth lens are directly bonded or indirectly bonded, and the fifth lens and the sixth lens are directly bonded or indirectly bonded. The seventh lens and the eighth lens are directly bonded or indirectly bonded, and the eighth lens and the ninth lens are directly bonded or indirectly bonded.

The high softening temperature optical glass material here refers to an optical glass material of which softening temperature is higher than both the temperature of reflow processing and the maximum environmental temperature in the design specifications of the junction type compound lens. In the following description, the phrase "high softening temperature optical glass material" is used when a thermal characteristic of the optical glass material is discussed, and the simple phrase "optical glass material" may be used when an optical characteristic is discussed.

The curable resin material does not soften once curing processing is performed, even if the temperature rises more than a predetermined temperature. This nature of the curable resin material is different from the nature of a plastic resin material, such as plastic material, which becomes soft and plasticized if the material is exposed to a temperature that exceeds a predetermined temperature, which is referred to as a "softening temperature" (also referred to as a "glass transition temperature"). In other words, once curing processing is performed and material solidifies, the geometric shape of the curable resin material does not change.

Therefore the geometric shapes of the first lens, the third lens, the fourth lens, the sixth lens, the seventh lens and the ninth lens do not change, and optical performance thereof does not deteriorate even if the lenses are placed in a high temperature environment. The second lens, the fifth lens and the eighth lens are also formed of a high softening temperature optical glass material, so the optical performance thereof does not deteriorate even under a high temperature environment. In the case of the second lens, the fifth lens and the eighth lens formed of a curable resin material as well, the optical performance thereof does not deteriorate even under a high temperature environment. The high temperature environment here refers to a temperature environment higher than both the temperature in reflow processing and the maximum temperature in the design specifications of the junction type compound lens.

Therefore the optical performance of the first junction type compound lens, the second junction type compound lens and the third junction type compound lens is guaranteed even in a high temperature environment, where the temperature is at the maximum, that is assumed in reflow processing and when the imaging lens is in use.

If the second lens, the fifth lens and the eighth lens are formed using a curable resin material, the following effect can be implemented. Compared with the case of forming these lenses using a high softening temperature optical glass material, the manufacturing accuracy of the thickness of the second lens, the fifth lens and the eighth lens is high. In other words, the manufacturing accuracy of the thickness of the second lens, the fifth lens and the eighth lens, in the case of using a high softening temperature optical glass material, is about $\pm 10$ μm, while the manufacturing accuracy of the thickness thereof, in the case of using a curable resin material, can be improved up to about $\pm 3$ μm. In this way, since the manufacturing accuracy of the thickness of the second lens, the fifth lens and the eighth lens can be increased, the imaging lens can be manufactured without deviating very much from various characteristics, such as aberration, that are assumed in design specifications.

In order to implement the above mentioned indirect bonding, an adhesive is used between the bonding surfaces. When the junction type compound lens is manufactured by indirect bonding, the first lens to the third lens are formed first, then an adhesive is coated on a surface of the second lens facing the first lens or the third lens, or on the surface of the first lens or the third lens facing the second lens, and both lenses are contacted. In the same way, the fourth lens to the sixth lens are formed first, then an adhesive is coated on a surface of the fifth lens facing the fourth lens or sixth lens, or on the surface of the fourth lens or sixth lens facing the fifth lens, and both lenses are contacted. In the same way, the seventh lens to the ninth lens are formed first, then an adhesive is coated on a surface of the eighth lens facing the seventh lens or ninth lens, or on the surface of the seventh lens or ninth lens facing the eighth lens, and both lenses are contacted.

Coating processing may be performed on a surface of the second lens facing the first lens or the third lens, and both lenses are indirectly bonded. Coating processing may be performed on a surface of the fifth lens facing the fourth lens or the sixth lens, and both lenses are indirectly bonded. Coating processing may be performed on the surface of the eighth lens facing the seventh lens or the ninth lens, and both lenses are indirectly bonded.

When indirect bonding is implemented, reflection in the interface between the second lens and the first lens or the third lens can be decreased if adhesive is selected so that the optical characteristics of the adhesive is utilized, such as selecting an appropriate refractive index of the adhesive with respect to the refractive index of the optical glass and the refractive index of the curable resin material. In the same way, the reflection in the interface between the fifth lens and the fourth lens or the sixth lens can be decreased. In the same way, the reflection in the interface between the eighth lens and the seventh lens or the ninth lens can be decreased. If the coating processing is performed on the surface of the second lens facing the first lens or the third lens, and these lenses are bonded, as mentioned above, the reflection in the interface with the first lens (or the third lens) can be decreased. In the same way, if coating processing is performed on the surface of the fifth lens facing the fourth lens or the sixth lens, and these lenses are bonded, as mentioned above, the reflection in the interface with the fourth lens (or the sixth lens) can be decreased. In the same way, if coating processing is performed on the surface of the eighth lens facing the seventh lens or the ninth lens, and these lenses are bonded, as mentioned above, the reflection in the interface with the seventh lens (or the ninth lens) can be decreased.

Now the optical characteristics of the imaging lens of the present invention will be described.

The optical structural principle of the imaging lens of the present invention implements two roles, which are aberration correction and image formation, by single junction type compound lenses, of which optical characteristics, such as the refractive index, are as uniform as possible. In other words, it is preferable that the respective refractive indexes and the Abbes number of the first to third lenses constituting the first junction type compound lens of the imaging lens of the present invention do not differ very much from each other. Also it is preferable that the respective refractive indexes and the Abbe numbers of the fourth to sixth lenses, constituting the second junction type compound lens, do not differ very much from each other. Also it is preferable that the respective refractive indexes and the Abbe numbers of the seventh to ninth lenses, constituting the third junction type compound lens, do not differ very much from each other.

This means that it is ideal that the respective refractive indexes and the Abbe numbers of the first to third lenses, the fourth to sixth lenses and the seventh to ninth lenses are the same as each other. In practical terms, however, it is extremely difficult to find a combination of an optical glass material and a curable resin material with which refractive indexes and Abbe numbers are precisely the same.

Therefore the inventor of the present invention checked, through various simulations and prototyping, the differences of the refractive indexes and the Abbe numbers between the optical glass material and the curable resin material constituting the first, second and third junction type compound lenses respectively, which could generated good images. As a result, it was confirmed that good images can be acquired by constructing an imaging lens which satisfies the above Conditions (1) to (12).

In other words, if the difference between the refractive index $N_1$ of the first lens and the refractive index $N_2$ of the second lens, the difference between the refractive index $N_2$ of the second lens and the refractive index $N_3$ of the third lens, the difference between the refractive index $N_4$ of the fourth lens and the refractive index $N_5$ of the fifth lens, the difference between the refractive index $N_5$ of the fifth lens and the refractive index $N_6$ of the sixth lens, the difference between the refractive index $N_7$ of the seventh lens and the refractive index $N_8$ of the eighth lens, and the difference between the refractive index $N_8$ of the eighth lens and the refractive index $N_9$ of the ninth lens are within 0.1 respectively, then the distortion aberration, astigmatism aberration and chromatic/spherical aberration become small enough to generate good images.

Also if the difference between the Abbe number $v_1$ of the first lens and the Abbe number $v_2$ of the second lens, the difference between the Abbe number $v_2$ of the second lens and the Abbe number $v_3$ of the third lens, the difference between the Abbe number $v_4$ of the fourth lens and the Abbe number $v_5$ of the fifth lens, the difference between the Abbe number $v_5$ of the fifth lens and the Abbe number $v_6$ of the sixth lens, the difference between the Abbe number $v_7$ of the seventh lens and the Abbe number $v_8$ of the eight lens, and the difference between the Abbe number $v_8$ of the eighth lens and the Abbe number $v_9$ of the ninth lens are within 30.0 respectively, then the value of the chromatic aberration can be small enough to generate good images, and the images can have sufficient contrast.

Moreover, as the following examples show, if the above Conditions (1) to (12) are satisfied, an imaging lens of which optical length is short enough to be installed in a portable telephone, of which back focus is long enough to insert such components as a filter and cover glass between the imaging lens and the image sensing plane, and with which good images can be acquired, can be implemented.

The first imaging lens of the present invention is characterized in that the aperture stop to define the entrance pupil is disposed between the first junction type compound lens and the second junction type compound lens. Hence the aperture stop has a function to remove a flare which is generated in the first junction type compound lens.

The second imaging lens of the present invention is characterized in that the aperture stop (first stop) to define the entrance pupil is disposed on the front face of the first junction type compound lens, that is, the object side of the first junction type compound lens. Hence the entrance pupil can be disposed closer to the object side, and the principal ray can be entered at an angle close to vertical to the image surface, and the generation of shading can be prevented. Therefore in the second imaging lens, the entrance pupil diameter can be set to be large, and a lens with a small F number, that is, a bright lens, can be implemented. As the later described embodiments show, the F numbers of the imaging lenses shown in Embodiments 2, 3 and 5, which are embodiments of the second imaging lens, are smaller than the F numbers of the imaging lenses shown in Embodiments 1 and 4, which are embodiments of the first imaging lens.

The first imaging lens, on the other hand, has a characteristic in which the F number can be easily changed in the manufacturing process. In other words, the size of the aperture stop is changed to change the F number of the imaging lens, and in the case of the first imaging lens where the aperture stop is disposed between the first junction type compound lens and the second junction compound lens, the F number can be changed simply by replacing the aperture stop.

But if the aperture stop is disposed on the front face of the first junction type compound lens, just like the case of the second imaging lens, the size of the aperture must be set in the stage of fabricating a barrel to secure the first to third junction type compound lenses constituting the imaging lens, so that the tip of the barrel plays a role of the aperture stop. In other words, every time the F number is changed, the barrel of the imaging lens must be redesigned, and the die to fabricate the barrel of the imaging lens must be recreated.

As described above, the first imaging lens and the second imaging lens have different characteristics. The imaging lens to be used is a matter of choice depending on an object to which the imaging lens is applied (e.g. portable telephone, digital camera).

EXPLANATION OF REFERENCE NUMERALS

Figure 1:
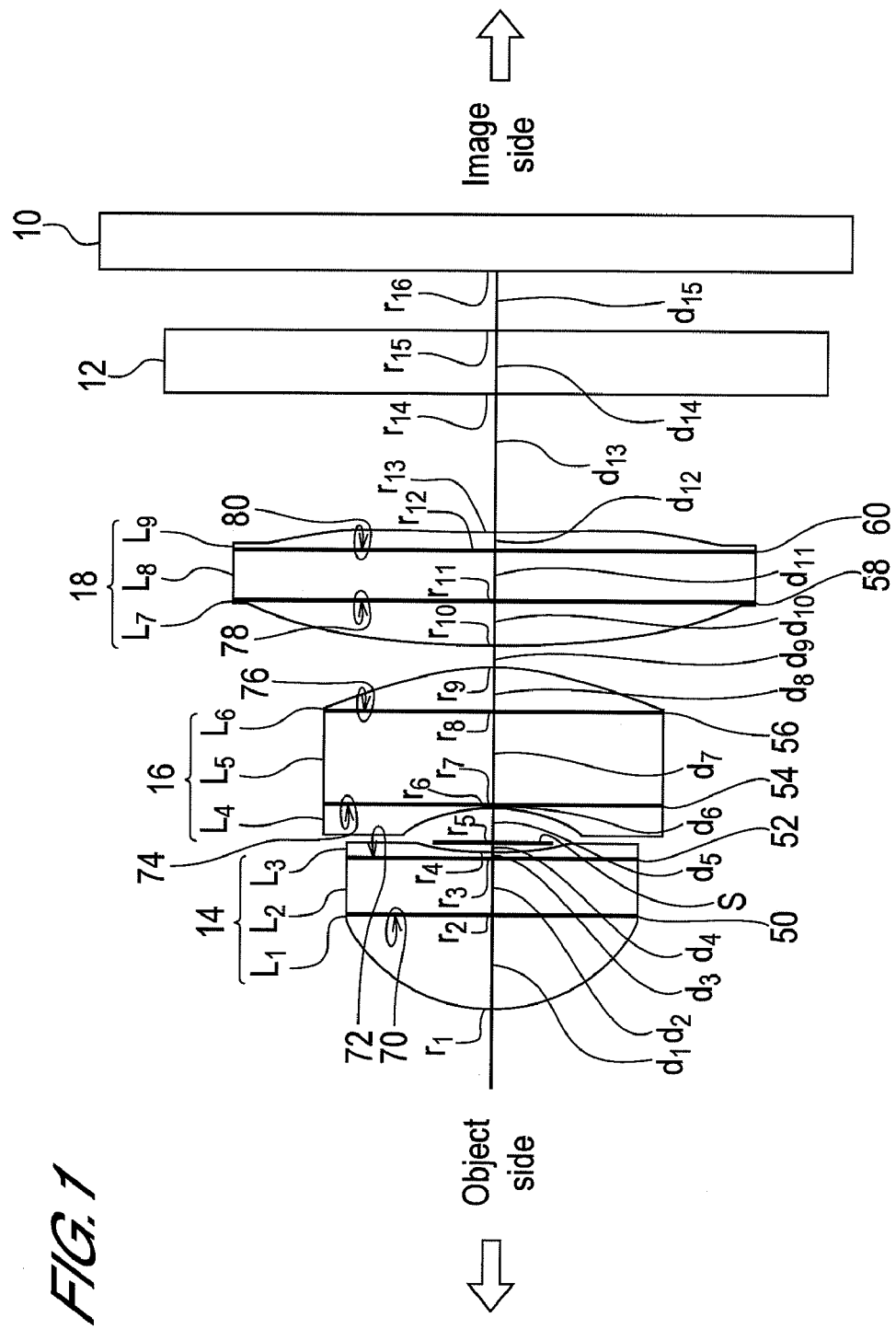
FIG. 1 is a cross-sectional view depicting a first imaging lens according to the present invention.

10: Image sensing element
12: Cover glass
14: First junction type compound lens
16: Second junction type compound lens
18: Third junction type compound lens
50, 52, 54, 56, 58, 60: Adhesive
70, 72, 74, 76, 78, 80: Coating film
S: Stop (aperture stop)
$S_1$: First stop
$S_2$: Second stop
$L_1$: First lens
$L_2$: Second lens
$L_3$: Third lens
$L_4$: Fourth lens
$L_5$: Fifth lens
$L_6$: Sixth lens
$L_7$: Seventh lens
$L_8$: Eighth lens
$L_9$: Ninth lens

BEST MODE FOR CARRYING OUT THE INVENTION

Embodiments of the present invention will now be described with reference to the drawings. Each drawing, however, simply illustrates one configuration example of the present invention, and roughly shows a cross-section of each composing element and positional relationship in order to assist in understanding the present invention, and is not for limiting the present invention to the illustrated example in the following description. Specific materials and conditions may be used, but these materials and conditions are merely examples of preferred embodiments, and therefore the present invention is not limited in any way by these materials and conditions.

Figure 6:
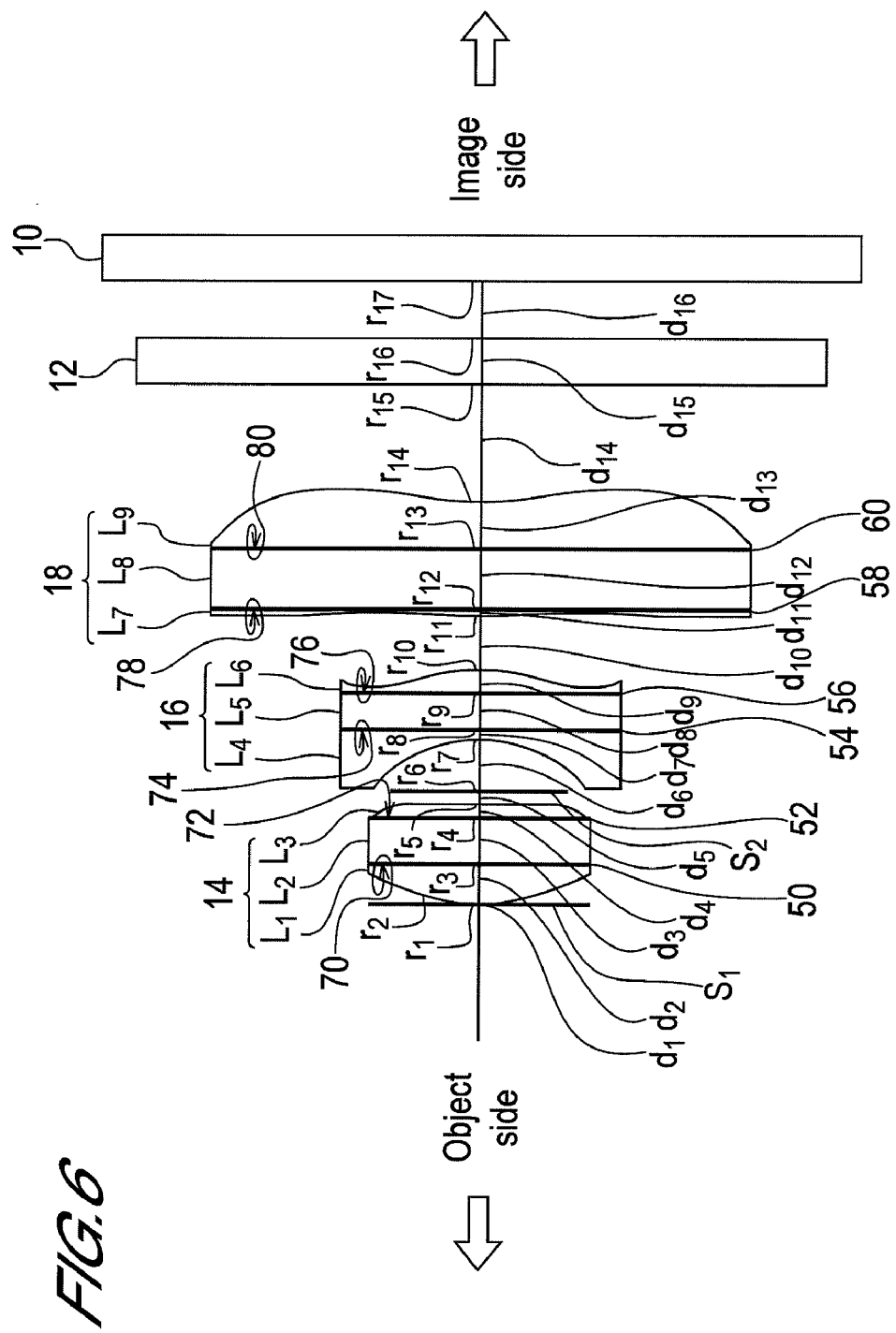
FIG. 6 is a cross-sectional view depicting a second imaging lens according to the present invention.

FIG. 1 is a diagram depicting a configuration of a first imaging lens of the present invention, and FIG. 6 is a diagram depicting a configuration of a second imaging lens of the present invention. Embodiments of the first imaging lens of the present invention are shown in Embodiment 1, Embodiment 4 and Embodiment 6. Embodiments of the second imaging lens of the present invention are shown in Embodiment 2, Embodiment 3 and Embodiment 5.

As FIG. 1 and FIG. 6 shows, a first, second and third lenses constituting a first junction type compound lens 14 are denoted with $L_1$, $L_2$ and $L_3$ respectively. A fourth, fifth and sixth lenses constituting a second junction type compound lens 16 are denoted with $L_4$, $L_5$ and $L_6$ respectively. And a seventh, eighth and ninth lenses constituting a third junction type compound lens 18 are denoted with $L_7$, $L_8$ and $L_9$ respectively.

In the first imaging lens of the present invention shown in FIG. 1, a stop S disposed between the first junction type compound lens 14 and the second junction type compound lens 16 plays a role of an aperture stop, and defines a position of an entrance pupil.

Whereas in the second imaging lens of the present invention shown in FIG. 6, a first stop $S_1$ disposed on the front face of the first junction type compound lens 14 (front face $r_2$ of the first lens) plays a role of an aperture stop, and defines a position of an entrance pupil. A second stop $S_2$ disposed between the first junction type compound lens 14 and the second junction type compound lens 16 plays a role of preventing a flare, which is a phenomena of lowered image contrast, or a smear, which is a phenomena of an image smearing.

In other words, in the second imaging lens of the present invention, the first stop $S_1$, which is a stop to play a role of determining the basic characteristics of the imaging lens, such as defining a position of an entrance pupil, specifying an F number and deciding various aberration characteristics including distortion aberration and astigmatism aberration, is an essential composing element in the present invention. Whereas the second stop $S_2$ is a composing element for improving the contrast of an image, that is, an added characteristic, therefore disposing the second stop $S_2$ is preferable, but the imaging lens of the present invention is established without it.

Within a range where no misunderstanding occurs, $r_i$ (i=1, 2, 3, ..., 17) may be used as a variable that indicates a value of a radius of curvature on an optical axis, or as a symbol that identifies a lens, cover glass surface or image sensing plane (e.g. $r_2$ is used to indicate the object side face of the first lens $L_1$ constituting the first junction type compound lens 14).

In FIG. 1, adhesives 50, 52, 54, 56, 58 and 60, for indirect bonding, exist on the interfaces indicated by $r_2$, $r_3$, $r_7$, $r_8$, $r_{11}$ and $r_{12}$ respectively. If coating processing has been performed on both sides or on one side of the second lens $L_2$, the coating film 70 or coating film 72 exists. If coating processing has been performed on both sides or on one side of the fifth lens $L_5$, the coating film 74 or coating film 76 exists. If coating processing has been performed on both sides or on one side of the eighth lens $L_8$, the coating film 78 or coating film 80 exists. In order to indicate the presence of the adhesives 50, 52, 54, 56, 58 and 60, and the coating films 70, 72, 74, 76, 78 and 80, the interfaces indicated by $r_2$, $r_3$, $r_7$, $r_8$, $r_{11}$ and $r_{12}$ are shown by bold lines.

In FIG. 6, adhesives 50, 52, 54, 56, 58 and 60, for indirect bonding, exist on the interfaces indicated by $r_3$, $r_4$, $r_8$, $r_9$, $r_{12}$ and $r_{13}$ respectively. If coating processing has been performed on both sides or on one side of the second lens $L_2$, the coating film 70 or coating film 72 exists. If coating processing has been performed on both sides or on one side of the fifth lens $L_5$, the coating film 74 or coating film 76 exists. If coating processing has been performed on both sides or on one side of the eighth lens $L_8$, the coating film 78 or coating film 80 exists. In order to indicate the presence of the adhesives 50, 52, 54, 56, 58 and 60, and the coating films 70, 72, 74, 76, 78 and 80, the interfaces indicated by $r_3$, $r_4$, $r_8$, $r_9$, $r_{12}$ and $r_{13}$ are shown by bold lines.

In FIG. 2, FIG. 7, FIG. 11, FIG. 15, FIG. 19 and FIG. 23, interfaces where the above mentioned adhesive or coating film exist are not shown by bold lines, and the adhesives 50, 52, 54, 56, 58 and 60, and coating films 70, 72, 74, 76, 78 and 80 are omitted so that the drawings do not become complicated. In the imaging lens of the present invention, the thickness of the adhesive is small enough not to reflect the optical characteristics of the imaging lens, so that the thickness of the adhesive is ignored, even if the adhesive exists on the interface. Needless to say, the bonding surfaces of the first and third lenses $L_1$ and $L_3$, to be directly or indirectly bonded to the second lens $L_2$, have a shape matching the bonding surface of the second lens $L_2$, the bonding surfaces of the fourth and sixth lenses $L_4$ and $L_6$, to be directly or indirectly bonded to the fifth lens $L_5$, have a shape matching the bonding surface of the fifth lens $L_5$, and the bonding surfaces of the seventh and ninth lenses $L_7$ and $L_9$, to be directly or indirectly bonded to the eight lens $L_8$, have a shape matching the bonding surface of the eight lens $L_8$.

Table 1 to Table 6 show the specific values of the parameters, such as $r_i$ (i=1, 2, 3, ..., 17), and $d_i$ (i=1, 2, 3, ..., 16) indicated in these drawings. The suffix i is added corresponding to the stops, surface number of each lens, thickness of the lens, or the surface spacing of the lens sequentially from the object side to the image side. j=1, 2, 3, ..., 9 and indicate the first, second, third, ..., ninth lens respectively. In other words, $r_i$ is a radius of curvature on the optical axis on the i-th surface, $d_i$ is a distance from then i-th surface to the (i+1)th surface, $N_3$ is a refractive index of the j-th lens $L_3$, and $v_j$ is an Abbe number of the material of the j-th lens L.

The reference symbols of the surface number $r_i$ (i=1, 2, 3, ..., 17) and the surface spacing $d_i$ (i=1, 2, 3, ..., 16) defined in FIG. 1 and FIG. 6 are omitted in FIG. 2, FIG. 7, FIG. 11, FIG. 15, FIG. 19 and FIG. 23 so that the drawings do not become complicated.

In FIG. 1 and FIG. 6, the aperture of the stop is shown by a segment. This is because the intersection of the stop surface and the optical axis must be clearly shown to define the distance from the lens surface to the stop surface. In FIG. 2, FIG. 7, FIG. 11, FIG. 15, FIG. 19 and FIG. 23, which are cross-sectional views of the imaging lenses of Embodiment 1 to Embodiment 6 respectively, a main body of the stop for shielding light is shown by the half lines of which start point is the edge of the aperture, by opening the aperture of the stop, which is unlike FIG. 1 and FIG. 6. This is because the state of the stop must be shown by opening the aperture of the stop in order to enter such a beam as a principal ray.

The optical length L is a distance from the object side face $r_1$ of the first lens $L_1$ to the image sensing plane in the first imaging lens, and is a distance from the first stop $S_1$ to the image sensing plane in the second imaging lens. The back focus bf is a distance from the image side surface of the ninth lens $L_9$ constituting the third junction type compound lens 18 to the image sensing plane. Here the length from the image side face of the ninth lens $L_9$ to the image sensing plane, which is measured without a cover glass, is regarded as the back focus bf.

Table 1 to Table 6 show the thickness of the first to the third junction type compound lenses constituting the imaging lenses of Embodiment 1 to Embodiment 6 respectively, and the data on the radius of curvature of the curved surfaces of the first to the ninth lenses constituting these lenses, and the positional spacing of these lenses and the positional relationship of these lenses and the stop. The aspherical data on the first, third, fourth, sixth, seventh and ninth lenses is shown in Table 1 to Table 6 respectively with surface numbers. The value $r_i$ (i=1, 2, 3, ..., 14) of the radius of curvature on the optical axis is a positive value if it is convex to the object side, and is a negative value if it is convex to the image side.

Both surfaces when the second lens is an optical-parallel plate, both surfaces when the fifth lens is an optical-parallel plate, both surfaces when the eighth lens is an optical-parallel plate, and surfaces of the stop S, the first stop $S_1$, the second stop $S_2$, and the cover glass (or filter), are planes, so the radius of curvature is indicated as ∞. The image sensing plane is a plane, but $r_{16}=\infty$ is omitted for $r_{16}$, which indicates an image sensing plane in Table 1, Table 4 and Table 6. Also $r_{17}=\infty$ is omitted for $r_{17}$, which indicates an image sensing plane in Table 2, Table 3 and Table 5.

The aspherical surface used for this invention is given by the following expression.

$$Z=ch^2/[1+[1-(1+k)c^2h^2]^{+1/2}]+A_4h^4+A_6h^6+A_8h^8+A_{10}h^{10}$$

where

Z: depth from the vertex of the surface to the contact surface c: curvature of the surface on the optical axis h: height from the optical axis k: cone constant $A_4$: aspherical surface coefficient of degree 4

$A_6$: aspherical surface coefficient of degree 6

$A_8$: aspherical surface coefficient of degree 8

$A_{10}$: aspherical surface coefficient of degree 10

In Table 1 to Table 6 in this description, the numeric value to indicate an aspherical surface coefficient is denoted by an exponent, "e-1" for example, which means "the −1th power of 10". The value indicated as the focal distance f is a composite focal distance of the first junction type compound lens, the second junction type compound lens, and the third junction type compound lens. For each embodiment, the open F number (also called an "open F value"), which is an index of the brightness of the lens, is indicated by Fno. The open F number refers to the F number when the diameter of the aperture stop is the maximum in design specifications. The diagonal length 2Y of the square image surface is indicated as the image height. Y is a value half the diagonal length of the square image surface.

Now the imaging lenses according to Embodiment 1 to Embodiment 6 will be described with reference to FIG. 1 to FIG. 26.

The distortion aberration curves shown in FIG. 3, FIG. 8, FIG. 12, FIG. 16, FIG. 20 and FIG. 24 show the aberration (unsatisfactory quantity of the tangent condition is shown in the abscissa by percentage) with respect to the distance from the optical axis (shown in the ordinate by percentage with the maximum distance from the optical axis within the image surface as 100). The astigmatism aberration curves shown in FIG. 4, FIG. 9, FIG. 13, FIG. 17, FIG. 21 and FIG. 25 show the aberration quantity (mm units) in the abscissa with respect to the distance from the optical axis (%) shown in the ordinate, just like the distortion aberration curves, and show the aberration quantity on the meridional surface and the sagittal surface respectively.

The chromatic/spherical aberration curve in FIG. 5, FIG. 10, FIG. 14, FIG. 18, FIG. 22 and FIG. 26 show the aberration quantity (mm units) in the abscissa with respect to the entrance height h in the ordinate. The entrance height h in the ordinate is shown as a value converted into an F number. For example, in the case of a lens of which Fno is 3.40, the entrance height h=100% of the ordinate corresponds to F=3.40.

For the chromatic/spherical aberration curves, the aberration values with respect to the C-line (light of which wavelength is 656.3 nm), d-line (light of which wavelength is 587.6 nm), e-line (light of which wavelength is 546.1 nm), F-line (light of which wavelength is 486.1 nm) and g-line (light of which wavelength is 435.8 nm).

Table 1 to Table 6 show the list of the radius of curvature (mm units), lens surface spacing (mm units), refractive index of lens material, Abbe number of lens material, focal distance, F number, image height and aspherical surface coefficient of composing lenses of Embodiment 1 to Embodiment 6 respectively. The radius of curvature on the optical axis and the lens surface spacing of the composing lenses are shown as values when the value of the composite focal distance f of the imaging lens is normalized to 1.00 mm.

In Embodiment 1 to Embodiment 5, a transparent curable silicone resin, which is a curable resin material, is used for the material of the first lens $L_1$ and the third lens $L_3$ constituting the first junction type compound lens 14, material of the fourth lens $L_4$ and the sixth lens $L_6$ constituting the second junction type compound lens 16, and material of the seventh lens $L_7$ and the ninth lens $L_9$ constituting the third junction type compound lens 18. Optical glass (e.g. BK7), which is an optical glass material, is used for the material of the second lens $L_2$, fifth lens $L_5$ and eighth lens $L_8$. Here BK7 is a name assigned by Schott Glass Co. to a group of boro-silicate glass. Optical glass BK7 is now manufactured by a plurality of glass manufacturers.

In Embodiment 6, a thermosetting silicone resin Silplus MHD, which is a curable resin material made by Nippon Steel Chemical Co., Ltd., is used for the materials of the second lens $L_2$, fifth lens $L_5$ and eighth lens $L_8$.

The refractive index and the Abbe number of commercial optical glass BK7 differ somewhat depending on the manufacturer or manufacturing lot. The refractive index of the optical glass BK7 (made by Ohara Inc.) with respect to the d-line (light with 587.6 nm wavelength) constituting the second lens $L_2$, fifth lens $L_5$ and eighth lens $L_8$ is 1.51633, and the Abbe number thereof is 64.0. The refractive index of the optical glass E-F5 (made by Hoya Corp.) with respect to the d-line (light with 587.6 nm wavelength) constituting the fifth lens $L_5$ of Embodiment 3 is 1.60342, and the Abbe number thereof is 38.0.

The transparent curable silicone resin refers to a silicone resin which is transparent to visible lights and with which the geometric shape of a lens does not change, and the optical performance does not deteriorate even if the environment temporarily becomes about 150° C. high temperature. The transparent curable silicone resin mentioned here can be selected from silicone resins commercialized under the name "transparent high hardness silicone resin" by silicone resin suppliers, for example.

In Embodiment 1 to Embodiment 5, the first lens $L_1$ and the second lens $L_2$ are indirectly bonded, and the second lens $L_2$ and the third lens $L_3$ are indirectly bonded. The fourth lens $L_4$ and the fifth lens $L_5$ are indirectly bonded, and the fifth lens $L_5$ and the sixth lens $L_6$ are indirectly bonded. The seventh lens $L_7$ and the eighth lens $L_8$ are indirectly bonded, and the eighth lens $L_8$ and the ninth lens $L_9$ are indirectly bonded. In Embodiment 6, the first lens $L_1$ and the second lens $L_2$ are directly bonded or indirectly bonded, and the second lens $L_2$ and the third lens $L_3$ are directly bonded or indirectly bonded. The fourth lens $L_4$ and the fifth lens $L_5$ are directly bonded or indirectly bonded, and the fifth lens $L_5$ and the sixth lens $L_6$ are directly bonded or indirectly bonded. The seventh lens $L_7$ and the eighth lens $L_8$ are directly bonded or indirectly bonded, and the eighth lens $L_8$ and the ninth lens $L_9$ are directly bonded or indirectly bonded.

For the curable resin material, which is a material of the first lens $L_1$, the third lens $L_3$, the fourth lens $L_4$, the sixth lens $L_6$, the seventh lens $L_7$ and the ninth lens $L_9$, SMX-7852 and SMX-7877 made by Fuji Polymer Industries Co., Ltd., and SR-7010 made by Dow Corning Toray Co., Ltd. are used. The refractive indexes and the Abbe numbers of these thermosetting silicone resins differ depending on the manufacturer and also differ somewhat even if the product name is the same. In the following embodiments, the thermosetting silicone resin material which was used is shown, along with the refractive index (d-line (light with 587.6 nm wavelength)) and the Abbe number thereof.

Epoxy adhesive can be used for an adhesive for the above mentioned indirect bonding. Specifically, a refractive index matching type optical adhesive (e.g. see <URL: http://keytech.ntt-at.co.jp/optic2/prd 1001.html> of NTT Advanced Technology Co. [searched on May 7, 2007]) can be used. This refractive index matching type optical adhesive has durability under heat, and even if this lens is temporarily placed in a high temperature environment, a form change, such as melting, does not occur, and the optical performance does not deteriorate. This refractive index matching type optical adhesive is transparent to visible lights, and the refractive index thereof can be adjusted in the range of 1.33 to 1.70 at a ±0.005 accuracy. As mentioned later, for the first to the ninth lenses constituting the junction type compound lens used for the imaging lens of the present invention, a material of which refractive index is in a 1.33 to 1.70 range is used. Therefore this refractive index matching type optical adhesive can be manufactured with controlling the refractive index thereof to be a value close to all the refractive indexes of the first to the ninth lenses.

The adhesive to be used for indirect bonding is not limited to the above mentioned example of the refractive index matching type optical adhesive, but can be any adhesive which is transparent and which satisfies the conditions of the refractive index and heat resistance. A condition for the refractive index of the adhesive is that the refractive index of the adhesive is close to both of the refractive indexes of the two lenses to be bonded. A condition for the heat resistance is that even if the adhesive, which is solidified and is in a state of bonding the two lenses, is placed in a high temperature environment in the reflow step or is placed in an environment which temporarily becomes high temperature, a form change, such as melting, does not occur, and optical performance thereof does not change.

As FIG. 1 shows, the first imaging lens of the present invention comprises a first junction type compound lens 14, a stop S (aperture stop), a second junction type compound lens 16, and a third junction type compound lens 18, where the first junction type compound lens 14, the stop S, the second junction type compound lens 16 and the third junction type compound lens 18 are arranged in this sequence from the object side to the image side.

As FIG. 6 shows, the second imaging lens of the present invention comprises a first stop $S_1$, a first junction type compound lens 14, a second stop $S_2$, a second junction type compound lens 16, and a third junction type compound lens 18, where the first stop $S_1$, the first junction type compound lens 14, the second stop $S_2$, the second junction type compound lens 16, and the third junction type compound lens 18 are arranged in this sequence froth the object side to the image side.

The first junction type compound lens 14 comprises a first lens $L_1$, a second lens $L_2$ and a third lens $L_2$, which are arranged in this sequence from the object side to the image side. The second junction type compound lens 16 comprises a fourth lens $L_4$, a fifth lens $L_5$ and a sixth lens $L_6$, which are arranged in this sequence from the object side to the image side. The third junction type compound lens 18 comprises a seventh lens $L_7$, an eighth lens $L_8$ and a ninth lens $L_9$, which are arranged in this sequence from the object side to the image side.

A color glass 12 is inserted between the third junction type compound lens 18 and the image sensing element 10. A material of the cover glass 12 is optical glass BK7 (made by Hoya Corp.) of which refractive index is 1.51633 and the Abbe number is 64.0. In the later mentioned Table 1 to Table 6, the refractive index and the Abbe number of the cover glass 12 are shown as N=1.51633 and ν=64.0 respectively.

Table 1 to Table 6 show the value $r_i$ (i=1, 2, 3, ..., 16) of the radius of curvature on the optical axis, surface spacing $d_i$ (i=1, 2, 3, ..., 16) and refractive index, Abbe number and aspherical surface coefficient of the lens composing material of the imaging lenses of Embodiment 1 to Embodiment 6. Here the composite focal distance by the first junction type compound lens, the second junction type compound lens and the third junction type compound lens is normalized to 1.00 mm.

The object side face of the first lens $L_1$ and the image side face of the third lens $L_3$ constituting the first junction type compound lens 14 are aspherical, the object side face of the fourth lens $L_4$ and the image side face of the sixth lens $L_6$ constituting the second junction type compound lens 16 are aspherical, and the object side face of the seventh lens $L_7$ and the image side face of the ninth lens $L_9$ constituting the third junction type compound lens 18 are aspherical.

TABLE 1

Embodiment 1

| Radius of Curvature($r_i$) | Distance($d_i$) | Refractive Index($N_i$) | Abbe Number($v_i$) | Aspherical Surface Coefficients | | | | |
|---|---|---|---|---|---|---|---|---|
| | | | | K | $A_4$ | $A_6$ | $A_8$ | $A_{10}$ |
| $r_1$ = 0.290 | | | | 2.679e−1 | −3.062e−1 | 3.708 | −9.974e+1 | 3.512e+3 |
| | $d_1$ = 0.1553 | $N_1$ = 1.51000 | $v_1$ = 56.0 | | | | | |
| $r_2$ = ∞ | | | | | | | | |
| | $d_2$ = 0.0945 | $N_2$ = 1.51633 | $v_2$ = 64.0 | | | | | |
| $r_3$ = ∞ | | | | | | | | |
| | $d_3$ = 0.0105 | $N_3$ = 1.51000 | $v_3$ = 56.0 | | | | | |
| $r_4$ = 0.661 | | | | 1.087e+1 | 3.263 | −6.012e+1 | −1.969e+3 | 2.877e+5 |
| | $d_4$ = 0.0144 | | | | | | | |
| $r_5$ = ∞ | | | | | | | | |
| | $d_5$ = 0.0589 | | | | | | | |
| $r_6$ = −0.307 | | | | 4.656e−1 | 5.992 | −1.188e+3 | 1.130e+5 | −4.010e+6 |
| | $d_6$ = 0.0057 | $N_4$ = 1.51000 | $v_4$ = 56.0 | | | | | |
| $r_7$ = ∞ | | | | | | | | |
| | $d_7$ = 0.1574 | $N_5$ = 1.51633 | $v_5$ = 64.0 | | | | | |
| $r_8$ = ∞ | | | | | | | | |
| | $d_8$ = 0.0735 | $N_6$ = 1.51000 | $v_6$ = 56.0 | | | | | |
| $r_9$ = −0.372 | | | | −2.627e−1 | 9.387 | −1.849 | −1.329e+1 | −2.264e+3 |
| | $d_9$ = 0.0355 | | | | | | | |
| $r_{10}$ = 2.495 | | | | 3.033e+1 | 8.360e−1 | 1.675 | −7.945 | −3.142e+1 |
| | $d_{10}$ = 0.0738 | $N_7$ = 1.51000 | $v_7$ = 56.0 | | | | | |
| $r_{11}$ = ∞ | | | | | | | | |
| | $d_{11}$ = 0.0839 | $N_8$ = 1.51633 | $v_8$ = 64.0 | | | | | |
| $r_{12}$ = ∞ | | | | | | | | |
| | $d_{12}$ = 0.0315 | $N_9$ = 1.51000 | $v_9$ = 56.0 | | | | | |
| $r_{13}$ = 1.839 | | | | −2.401e+1 | −5.705 | 3.180e+1 | −9.030e+1 | 1.766e+2 |
| | $d_{13}$ = 0.2295 | | | | | | | |

TABLE 1-continued

Embodiment 1

| Radius of Curvature($r_i$) | Distance($d_i$) | Refractive Index($N_i$) | Abbe Number($\nu_i$) | Aspherical Surface Coefficients | | | | |
|---|---|---|---|---|---|---|---|---|
| | | | | K | $A_4$ | $A_6$ | $A_8$ | $A_{10}$ |
| $r_{14} = \infty$ | | | | | | | | |
| | $d_{14} = 0.1049$ | $N = 1.51633$ | $\nu = 64.0$ | | | | | |
| $r_{15} = \infty$ | | | | | | | | |
| | $d_{15} = 0.1000$ | | | | | | | |

Focal Distance f = 1.00 mm
F-Number $F_{no}$ = 3.40
Image Height 2Y = 1.172 mm

TABLE 2

Embodiment 2

| Radius of Curvature($r_i$) | Distance($d_i$) | Refractive Index($N_i$) | Abbe Number($\nu_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.324$ | | | | 1.102 | −5.858 | −1.033e+2 | 3.814e+3 | −2.282e+5 |
| | $d_2 = 0.0694$ | $N_1 = 1.51000$ | $\nu_1 = 56.0$ | | | | | |
| $r_3 = \infty$ | | | | | | | | |
| | $d_3 = 0.0785$ | $N_2 = 1.51633$ | $\nu_2 = 64.0$ | | | | | |
| $r_4 = \infty$ | | | | | | | | |
| | $d_4 = 0.0262$ | $N_3 = 1.51000$ | $\nu_3 = 56.0$ | | | | | |
| $r_5 = -51.004$ | | | | 1.791e+4 | −8.623 | −1.712e+1 | −4.432e+3 | −1.243e+5 |
| | $d_5 = 0.0219$ | | | | | | | |
| $r_6 = \infty$ | | | | | | | | |
| | $d_6 = 0.0890$ | | | | | | | |
| $r_7 = -0.216$ | | | | 1.473e−1 | 1.714e+1 | 2.890e+2 | 1.357e+3 | −3.232e+5 |
| | $d_7 = 0.0157$ | $N_4 = 1.51000$ | $\nu_4 = 56.0$ | | | | | |
| $r_8 = \infty$ | | | | | | | | |
| | $d_8 = 0.0654$ | $N_5 = 1.51633$ | $\nu_5 = 64.0$ | | | | | |
| $r_9 = \infty$ | | | | | | | | |
| | $d_9 = 0.0393$ | $N_6 = 1.51000$ | $\nu_6 = 56.0$ | | | | | |
| $r_{10} = -0.318$ | | | | −1.587 | 5.267 | 5.294e+2 | −5.318e+3 | 1.001e+4 |
| | $d_{10} = 0.0953$ | | | | | | | |
| $r_{11} = 0.917$ | | | | −2.434e+2 | −4.287 | 3.777e+1 | −1.443e+2 | 2.430e+2 |
| | $d_{11} = 0.0091$ | $N_7 = 1.51000$ | $\nu_7 = 56.0$ | | | | | |
| $r_{12} = \infty$ | | | | | | | | |
| | $d_{12} = 0.1047$ | $N_8 = 1.51633$ | $\nu_8 = 64.0$ | | | | | |
| $r_{13} = \infty$ | | | | | | | | |
| | $d_{13} = 0.0837$ | $N_9 = 1.51000$ | $\nu_9 = 56.0$ | | | | | |
| $r_{14} = 0.465$ | | | | −2.873e+1 | −3.141 | 9.020e−2 | 2.310e+1 | −1.201e+2 |
| | $d_{14} = 0.2022$ | | | | | | | |
| $r_{15} = \infty$ | | | | | | | | |
| | $d_{15} = 0.0785$ | $N = 1.51633$ | $\nu = 64.0$ | | | | | |
| $r_{16} = \infty$ | | | | | | | | |
| | $d_{16} = 0.1000$ | | | | | | | |

Focal Distance f = 1.00 mm
F-Number $F_{no}$ = 2.90
Image Height 2Y = 1.260 mm

TABLE 3

Embodiment 3

| Radius of Curvature($r_i$) | Distance($d_i$) | Refractive Index($N_i$) | Abbe Number($\nu_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.351$ | | | | 1.340 | −5.036 | −1.009e+2 | 2.086e+3 | −1.402e+5 |
| | $d_2 = 0.0597$ | $N_1 = 1.53000$ | $\nu_1 = 35.0$ | | | | | |
| $r_3 = \infty$ | | | | | | | | |
| | $d_3 = 0.0878$ | $N_2 = 1.51633$ | $\nu_2 = 64.0$ | | | | | |
| $r_4 = \infty$ | | | | | | | | |
| | $d_4 = 0.0329$ | $N_3 = 1.53000$ | $\nu_3 = 35.0$ | | | | | |

TABLE 3-continued

Embodiment 3

| Radius of Curvature($r_i$) | Distance($d_i$) | Refractive Index($N_i$) | Abbe Number($\nu_i$) | Aspherical Surface Coefficients | | | | |
|---|---|---|---|---|---|---|---|---|
| | | | | K | $A_4$ | $A_6$ | $A_8$ | $A_{10}$ |
| $r_5 = -17.554$ | | | | 1.062e+4 | −7.948 | −6.007e+1 | −2.578e+3 | −6.919e+4 |
| | $d_5 = 0.0211$ | | | | | | | |
| $r_6 = \infty$ | | | | | | | | |
| | $d_6 = 0.0940$ | | | | | | | |
| $r_7 = -0.214$ | | | | 2.700e−2 | 1.110e+1 | 3.585e+2 | 2.293e+2 | −1.379e+5 |
| | $d_7 = 0.0147$ | $N_4 = 1.60000$ | $\nu_4 = 30.0$ | | | | | |
| $r_8 = \infty$ | | | | | | | | |
| | $d_8 = 0.0658$ | $N_5 = 1.60342$ | $\nu_5 = 38.0$ | | | | | |
| $r_9 = \infty$ | | | | | | | | |
| | $d_9 = 0.0439$ | $N_6 = 1.60000$ | $\nu_6 = 30.0$ | | | | | |
| $r_{10} = -0.343$ | | | | −5.390e−1 | 5.032e−1 | 4.563e+2 | −3.511e+3 | 8.214e+3 |
| | $d_{10} = 0.0987$ | | | | | | | |
| $r_{11} = 0.614$ | | | | −4.296e+1 | −3.386 | 2.668e+1 | −1.135e+2 | 2.311e+2 |
| | $d_{11} = 0.0292$ | $N_7 = 1.53000$ | $\nu_7 = 35.0$ | | | | | |
| $r_{12} = \infty$ | | | | | | | | |
| | $d_{12} = 0.1097$ | $N_8 = 1.51633$ | $\nu_8 = 64.0$ | | | | | |
| $r_{13} = \infty$ | | | | | | | | |
| | $d_{13} = 0.0658$ | $N_9 = 1.53000$ | $\nu_9 = 35.0$ | | | | | |
| $r_{14} = 0.530$ | | | | −2.100e+1 | −3.682 | 1.083e+1 | −3.730e+1 | 3.258e+1 |
| | $d_{14} = 0.2477$ | | | | | | | |
| $r_{15} = \infty$ | | | | | | | | |
| | $d_{15} = 0.0658$ | $N = 1.51633$ | $\nu = 64.0$ | | | | | |
| $r_{16} = \infty$ | | | | | | | | |
| | $d_{16} = 0.1000$ | | | | | | | |

Focal Distance f = 1.00 mm
F-Number $F_{no}$ = 2.96
Image Height 2Y = 1.262 mm

TABLE 4

Embodiment 4

| Radius of Curvature($r_i$) | Distance($d_i$) | Refractive Index($N_i$) | Abbe Number($\nu_i$) | Aspherical Surface Coefficients | | | | |
|---|---|---|---|---|---|---|---|---|
| | | | | K | $A_4$ | $A_6$ | $A_8$ | $A_{10}$ |
| $r_1 = 0.295$ | | | | 2.680e−1 | −2.911e−1 | 3.410 | −8.867e+1 | 3.019e+3 |
| | $d_1 = 0.0596$ | $N_1 = 1.51000$ | $\nu_1 = 56.0$ | | | | | |
| $r_2 = 0.344$ | | | | | | | | |
| | $d_2 = 0.1945$ | $N_2 = 1.51633$ | $\nu_2 = 64.0$ | | | | | |
| $r_3 = 1.475$ | | | | | | | | |
| | $d_3 = 0.0108$ | $N_3 = 1.51000$ | $\nu_3 = 56.0$ | | | | | |
| $r_4 = 0.672$ | | | | 1.088e+1 | 3.103 | −5.527e+1 | −1.750e+3 | 2.473e+5 |
| | $d_4 = 0.0147$ | | | | | | | |
| $r_5 = \infty$ | | | | | | | | |
| | $d_5 = 0.0599$ | | | | | | | |
| $r_6 = -0.312$ | | | | 4.656e−1 | 5.697 | −1.092e+3 | 1.005e+5 | −3.447e+6 |
| | $d_6 = 0.0058$ | $N_4 = 1.51000$ | $\nu_4 = 56.0$ | | | | | |
| $r_7 = -0.984$ | | | | | | | | |
| | $d_7 = 0.1994$ | $N_5 = 1.51633$ | $\nu_5 = 64.0$ | | | | | |
| $r_8 = -0.787$ | | | | | | | | |
| | $d_8 = 0.0354$ | $N_6 = 1.51000$ | $\nu_6 = 56.0$ | | | | | |
| $r_9 = -0.378$ | | | | −2.630e−1 | 8.926 | −1.700 | −1.181e+1 | −1.946e+3 |
| | $d_9 = 0.0361$ | | | | | | | |
| $r_{10} = 2.538$ | | | | 3.033e+1 | 7.948e−1 | 1.540 | −7.063 | −2.701e+1 |
| | $d_{10} = 0.0357$ | $N_7 = 1.51000$ | $\nu_7 = 56.0$ | | | | | |
| $r_{11} = 2.360$ | | | | | | | | |
| | $d_{11} = 0.1444$ | $N_8 = 1.51633$ | $\nu_8 = 64.0$ | | | | | |
| $r_{12} = -2.262$ | | | | | | | | |
| | $d_{12} = 0.0124$ | $N_9 = 1.51000$ | $\nu_9 = 56.0$ | | | | | |
| $r_{13} = 1.871$ | | | | −2.401e+1 | −5.424 | 2.924e+1 | −8.027e+1 | 1.518e+2 |
| | $d_{13} = 0.2200$ | | | | | | | |
| $r_{14} = \infty$ | | | | | | | | |
| | $d_{14} = 0.1067$ | $N = 1.51633$ | $\nu = 64.0$ | | | | | |
| $r_{15} = \infty$ | | | | | | | | |
| | $d_{15} = 0.1001$ | | | | | | | |

Focal Distance f = 1.00 mm
F-Number $F_{no}$ = 3.40
Image Height 2Y = 1.144 mm

TABLE 5

Embodiment 5

| Radius of Curvature($r_i$) | Distance($d_i$) | Refractive Index($N_i$) | Abbe Number($\nu_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.325$ | | | | 1.102 | −5.758 | −1.004e+2 | 3.664e+3 | −2.166e+5 |
| | $d_2 = 0.0509$ | $N_1 = 1.51000$ | $\nu_1 = 56.0$ | | | | | |
| $r_3 = 1.421$ | | | | | | | | |
| | $d_3 = 0.1074$ | $N_2 = 1.51633$ | $\nu_2 = 64.0$ | | | | | |
| $r_4 = -0.947$ | | | | | | | | |
| | $d_4 = 0.0168$ | $N_3 = 1.51000$ | $\nu_3 = 56.0$ | | | | | |
| $r_5 = -51.298$ | | | | 1.791e+4 | −8.476 | −1.663e+1 | −4.257e+3 | −1.180e+5 |
| | $d_5 = 0.0221$ | | | | | | | |
| $r_6 = \infty$ | | | | | | | | |
| | $d_6 = 0.0895$ | | | | | | | |
| $r_7 = -0.218$ | | | | 1.473e−1 | 1.684e+1 | 2.808e+2 | 1.304e+3 | −3.068e+5 |
| | $d_7 = 0.0158$ | $N_4 = 1.51000$ | $\nu_4 = 56.0$ | | | | | |
| $r_8 = -0.379$ | | | | | | | | |
| | $d_8 = 0.0848$ | $N_5 = 1.51633$ | $\nu_5 = 64.0$ | | | | | |
| $r_9 = -0.947$ | | | | | | | | |
| | $d_9 = 0.0206$ | $N_6 = 1.51000$ | $\nu_6 = 56.0$ | | | | | |
| $r_{10} = -0.320$ | | | | −1.587 | 5.177 | 5.144e+2 | −5.108e+3 | 9.503e+3 |
| | $d_{10} = 0.0958$ | | | | | | | |
| $r_{11} = 0.923$ | | | | −2.434e+2 | −4.214 | 3.670e+1 | −1.386e+2 | 2.307e+2 |
| | $d_{11} = 0.0284$ | $N_7 = 1.51000$ | $\nu_7 = 56.0$ | | | | | |
| $r_{12} = -4.735$ | | | | | | | | |
| | $d_{12} = 0.1524$ | $N_8 = 1.51633$ | $\nu_8 = 64.0$ | | | | | |
| $r_{13} = -1.894$ | | | | | | | | |
| | $d_{13} = 0.0179$ | $N_9 = 1.51000$ | $\nu_9 = 56.0$ | | | | | |
| $r_{14} = 0.467$ | | | | −2.873e+1 | −3.087 | 8.764e−2 | 2.219e+1 | −1.141e+2 |
| | $d_{14} = 0.1980$ | | | | | | | |
| $r_{15} = \infty$ | | | | | | | | |
| | $d_{15} = 0.0788$ | $N = 1.51633$ | $\nu = 64.0$ | | | | | |
| $r_{16} = \infty$ | | | | | | | | |
| | $d_{16} = 0.1000$ | | | | | | | |

Focal Distance f = 1.00 mm
F-Number $F_{no}$ = 2.80
Image Height 2Y = 1.240 mm

TABLE 6

Embodiment 6

| Radius of Curvature($r_i$) | Distance($d_i$) | Refractive Index($N_i$) | Abbe Number($\nu_i$) | Aspherical Surface Coefficients | | | | |
|---|---|---|---|---|---|---|---|---|
| | | | | K | $A_4$ | $A_6$ | $A_8$ | $A_{10}$ |
| $r_1 = 0.2897$ | | | | 2.679e−1 | −3.062e−1 | 3.708 | −9.974e+1 | 3.512e+3 |
| | $d_1 = 0.1553$ | $N_1 = 1.51000$ | $\nu_1 = 56.0$ | | | | | |
| $r_2 = \infty$ | | | | | | | | |
| | $d_2 = 0.0945$ | $N_2 = 1.51100$ | $\nu_2 = 36.0$ | | | | | |
| $r_3 = \infty$ | | | | | | | | |
| | $d_3 = 0.0105$ | $N_3 = 1.51000$ | $\nu_3 = 56.0$ | | | | | |
| $r_4 = 0.6609$ | | | | 1.087e+1 | 3.263 | −6.012e+1 | −1.969e+3 | 2.877e+5 |
| | $d_4 = 0.0144$ | | | | | | | |
| $r_5 = \infty$ | | | | | | | | |
| | $d_5 = 0.0589$ | | | | | | | |
| $r_6 = -0.3072$ | | | | 4.656e−1 | 5.992 | −1.188e+3 | 1.130e+5 | −4.010e+6 |
| | $d_6 = 0.0057$ | $N_4 = 1.51000$ | $\nu_4 = 56.0$ | | | | | |
| $r_7 = \infty$ | | | | | | | | |
| | $d_7 = 0.1574$ | $N_5 = 1.51100$ | $\nu_5 = 36.0$ | | | | | |
| $r_8 = \infty$ | | | | | | | | |
| | $d_8 = 0.0735$ | $N_6 = 1.51000$ | $\nu_6 = 56.0$ | | | | | |
| $r_9 = -0.3720$ | | | | −2.627e−1 | 9.387 | −1.849 | −1.329e+1 | −2.264e+3 |
| | $d_9 = 0.0355$ | | | | | | | |
| $r_{10} = 2.4953$ | | | | 3.033e+1 | 8.360e−1 | 1.675 | −7.945 | −3.142e+1 |
| | $d_{10} = 0.0738$ | $N_7 = 1.51000$ | $\nu_7 = 56.0$ | | | | | |
| $r_{11} = \infty$ | | | | | | | | |
| | $d_{11} = 0.0839$ | $N_8 = 1.51100$ | $\nu_8 = 36.0$ | | | | | |
| $r_{12} = \infty$ | | | | | | | | |
| | $d_{12} = 0.0315$ | $N_9 = 1.51000$ | $\nu_9 = 56.0$ | | | | | |
| $r_{13} = 1.8395$ | | | | −2.401e+1 | −5.705 | 3.180e+1 | −9.030e+1 | 1.766e+2 |
| | $d_{13} = 0.2295$ | | | | | | | |

TABLE 6-continued

Embodiment 6

| Radius of Curvature($r_i$) | Distance($d_i$) | Refractive Index($N_i$) | Abbe Number($v_i$) | Aspherical Surface Coefficients | | | |
|---|---|---|---|---|---|---|---|
| | | | | K | $A_4$ | $A_6$ | $A_8$ | $A_{10}$ |
| $r_{14} = \infty$ | | | | | | | | |
| | $d_{14} = 0.1049$ | N = 1.51633 | v = 64.0 | | | | | |
| $r_{15} = \infty$ | | | | | | | | |
| | $d_{15} = 0.0991$ | | | | | | | |

Focal Distance f = 1.00 mm
F-Number $F_{no}$ = 3.40
Image Height 2Y = 1.172 mm

The junction type compound lenses used in Embodiment 1 to Embodiment 5 are manufactured by indirectly bonding lenses. This indirect bonding is implemented by using an adhesive there between. Since this procedure is the same for both the first junction type compound lens, the second junction type compound lens, and the third junction type compound lens, the first junction type compound lens will be described here as an example. In this case, the first to the third lens, $L_1$ to $L_3$, are formed first, then adhesive is coated on the surface of the second lens $L_2$ facing the first lens $L_1$ or the third lens $L_3$, or on the surface of the first lens $L_1$ or the third lens $L_3$, facing the second lens $L_2$, and both lenses are contacted.

Coating processing could be performed at least on one surface of the second lens $L_2$ facing the first lens $L_1$ or the third lens $L_3$, then both lenses are bonded. In this case, indirect bonding or direct bonding, mentioned below, could be performed after the coating processing.

The junction type compound lens used for Embodiment 6 is manufactured by directly bonding or indirectly bonding the lenses.

The following steps are performed (for details, see Patent No. 3926380) to manufacture the junction type compound lens by direct bonding. In this case as well, the procedure is the same for the first junction type compound lens, the second junction type compound lens, and the third type compound lens, so the first junction type compound lens will be described here as an example.

A die for forming the first lens $L_1$, that can be bonded to the second lens $L_2$, is prepared. This die is a cylinder where the side wall of the inner face is cylindrical, and the bottom face is a curved shape, the same as the object side face of the first lens $L_1$. A transparent curable silicone resin, which is in a liquid state before curing, is injected into the die, and thermo-curing processing or UV curing processing is performed to form the first lens $L_1$, and the first lens $L_1$ is bonded to the second lens $L_2$.

Then a die for forming the third lens $L_3$, which is bonded to the above compound lens where the first lens $L_1$ and the second lens $L_2$ are bonded, is prepared. The bottom face of this die has a shape the same as the image face of the third lens $L_3$. A transparent curable silicone resin, which is in a liquid state before curing, is injected into the die, thermo-curing processing or UV curing processing is performed to form the third lens $L_3$, and the third lens $L_3$ is bonded to the second lens $L_2$, where the first lens $L_1$ is bonded. Thus the junction type compound lens is formed.

In the above mentioned manufacturing steps of the junction type compound lens, if the first lens $L_1$ and the third lens $L_3$ are formed of thermosetting resin material, a temperature control device for increasing the temperature of the dies and controlling processing is required. If the first lens $L_1$ and the third lens $L_3$ are formed of a UV curable resin, the manufacturing device for the junction type compound lens is designed so that ultraviolet can be irradiated onto the UV curable resin from an area above the die.

Embodiment 1

Embodiment 1 is an embodiment of the first imaging lens of the present invention, where the first lens $L_1$, the third lens $L_3$, the fourth lens $L_4$, the sixth lens $L_6$, the seventh lens $L_7$ and the ninth lens $L_9$ are formed of transparent curable silicone resin SMX-7852 (made by Fuji Polymer Industries Co. Ltd.), and the second lens $L_2$, the fifth lens $L_5$ and the eighth lens $L_8$ are formed of optical glass BK7 (made by Ohara Inc.).
(A) The refractive index $N_1$ of the first lens $L_1$ is $N_1$=1.51000.
(B) The refractive index $N_2$ of the second lens $L_2$ is $N_2$=1.51633.
(C) The refractive index $N_3$ of the third lens $L_3$ is $N_3$=1.51000.
(D) The Abbe number $v_1$ of the first lens $L_1$ is $v_1$=56.0.
(E) The Abbe number $v_2$ of the second lens $L_2$ is $v_2$=64.0.
(F) The Abbe number $v_3$ of the third lens $L_3$ is $v_3$=56.0.
(G) The refractive index $N_4$ of the fourth lens $L_4$ is $N_4$=1.51000.
(H) The refractive index $N_5$ of the fifth lens $L_5$ is $N_5$=1.51633.
(I) The refractive index $N_6$ of the sixth lens $L_6$ is $N_6$=1.51000.
(J) The Abbe number $v_4$ of the fourth lens $L_4$ is $v_4$=56.0.
(K) The Abbe number $v_5$ of the fifth lens $L_5$ is $v_5$=64.0.
(L) The Abbe number $v_6$ of the sixth lens $L_6$ is $v_6$=56.0.
(M) The refractive index $N_7$ of the seventh lens $L_7$ is $N_7$=1.51000.
(N) The refractive index $N_8$ of the eighth lens $L_8$ is $N_8$=1.51633.
(O) The refractive index $N_9$ of the ninth lens $L_9$ is $N_9$=1.51000.
(P) The Abbe number $v_7$ of the seventh lens $L_7$ is $v_7$=56.0.
(Q) The Abbe number $v_8$ of the eighth lens $L_8$ is $v_8$=64.0.
(R) The Abbe number $v_9$ of the ninth lens $L_9$ is $v_9$=56.0.

Therefore $|N_2-N_1|=|N_2-N_3|=|N_5-N_4|=|N_5-N_6|=|N_8-N_7|=|N_8-N_9|=0.00633$, which satisfies the following Conditions (1), (2), (5), (6), (9) and (10). Also $|v_2-v_1|=|v_2-v_3|=|v_5-v_4|=|v_5-v_6|=|v_8-v_7|=|v_8-v_9|=8.0$, which satisfies the following Conditions (3), (4), (7), (8), (11) and (12).

The Conditions (1), (2), (5), (6), (9) and (10) refer to the Conditions given by Expression (1), (2), (5), (6), (9) and (10) respectively. The Conditions (3), (4), (7), (8), (11) and (12) refer to the Conditions given by Expression (3), (4), (7), (8), (11) and (12).

$$0 \leq |N_2-N_1| \leq 0.1 \tag{1}$$

$$0 \leq |N_2-N_3| \leq 0.1 \tag{2}$$

$$0 \leq |v_2-v_1| \leq 30.0 \tag{3}$$

$$0 \leq |v_2 - v_3| \leq 30.0 \quad (4)$$

$$0 \leq |N_5 - N_4| \leq 0.1 \quad (5)$$

$$0 \leq |N_5 - N_6| \leq 0.1 \quad (6)$$

$$0 \leq |v_5 - v_4| \leq 30.0 \quad (7)$$

$$0 \leq |v_5 - v_6| \leq 30.0 \quad (8)$$

$$0 \leq |N_8 - N_7| \leq 0.1 \quad (9)$$

$$0 \leq |N_8 - N_9| \leq 0.1 \quad (10)$$

$$0 \leq |v_8 - v_7| \leq 30.0 \quad (11)$$

$$0 \leq |v_8 - v_9| \leq 30.0 \quad (12)$$

The Conditions (1) to (12) refer to the Conditions given by Expression (1) to (12) respectively, which is the same for the description herein below (description on Embodiment 2 to Embodiment 5).

Figure 2:
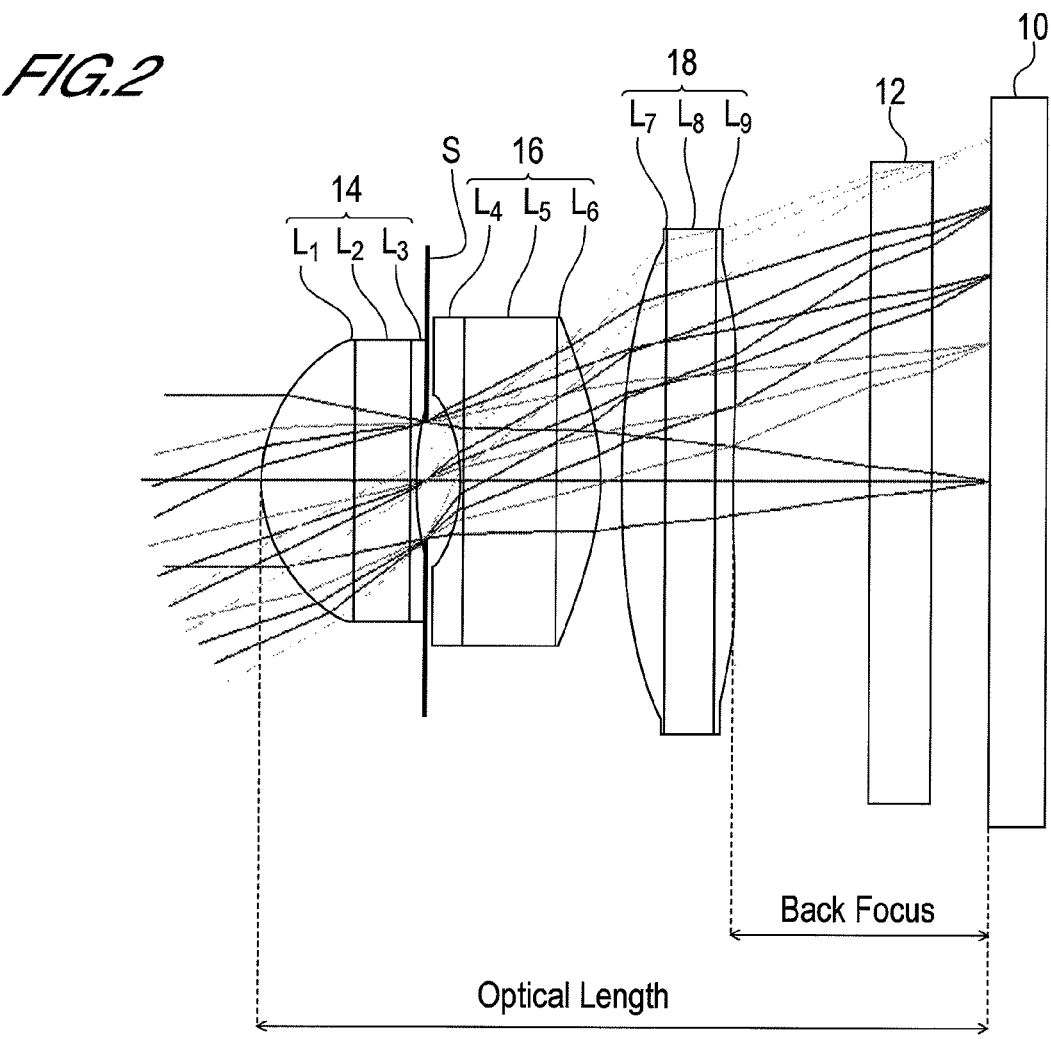
FIG. 2 is a cross-sectional view depicting an imaging lens according to Embodiment 1.

FIG. 2 is a cross-sectional view of the imaging lens of Embodiment 1. As FIG. 2 shows, the aperture stop S is formed between the first junction type compound lens 14 and the second junction type compound lens 16. The stop surface of the aperture stop S is a plane, so $r_5 = \infty$ is indicated in Table 1. The F number Fno is 3.40.

As Table 1 shows, $r_2 = \infty$ and $r_3 = \infty$, so the second lens $L_2$ is an optical-parallel plate, $r_7 = \infty$ and $r_8 = \infty$, so the fifth lens $L_5$ is an optical-parallel plate, and $r_{11} = \infty$ and $r_{12} = \infty$, so the eighth lens $L_8$ is an optical-parallel plate.

$r_1$ is a positive value and $r_4$ is a positive value, so the first lens $L_1$ is a plano-convex lens where the object side face of this first lens $L_1$ is a convex surface facing the object side on a paraxial line, and the third lens $L_3$ is a plano-concave lens where the image side face of this third lens $L_3$ is a concave surface facing the image side on a paraxial line. $r_6$ is a negative value and $r_9$ is also a negative value, so the fourth lens $L_4$ is a plano-concave lens where the object side face of this fourth lens $L_4$ is a concave surface facing the object side on a paraxial line, and the sixth lens $L_6$ is a plano-convex lens where the image side face of this sixth lens $L_6$ is a convex surface facing the image side on a paraxial line. $r_{10}$ is a positive value and $r_{13}$ is also a positive value, so the seventh lens $L_7$ is a plano-convex lens where the object side face of this seventh lens $L_7$ is a convex surface facing the object side on a paraxial line, and the ninth lens $L_9$ is a plano-concave lens where the image side face of this ninth lens $L_9$ is a concave surface facing the image side on a paraxial line.

In Embodiment 1, the optical length L with respect to the focal distance f=1.00 mm is 1.229 mm, and the back focus bf is 0.399 mm.

Figure 3:
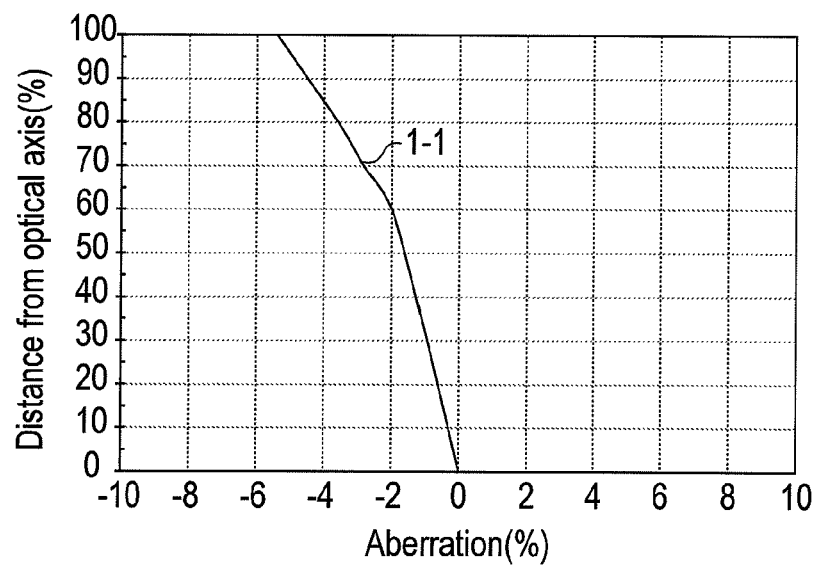
FIG. 3 is a diagram depicting the distortion aberration of the imaging lens of Embodiment 1.
Figure 4:
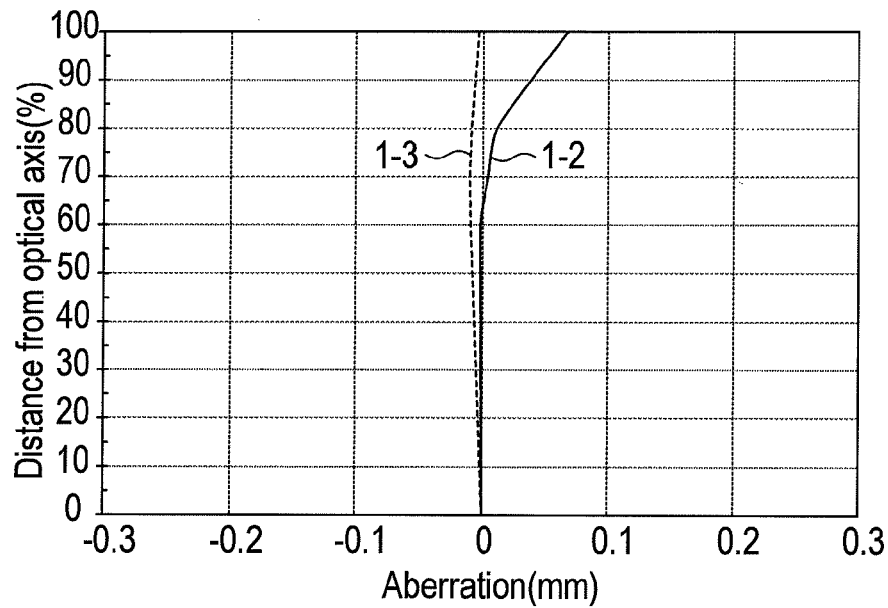
FIG. 4 is a diagram depicting the astigmatism aberration of the imaging lens of Embodiment 1.
Figure 5:
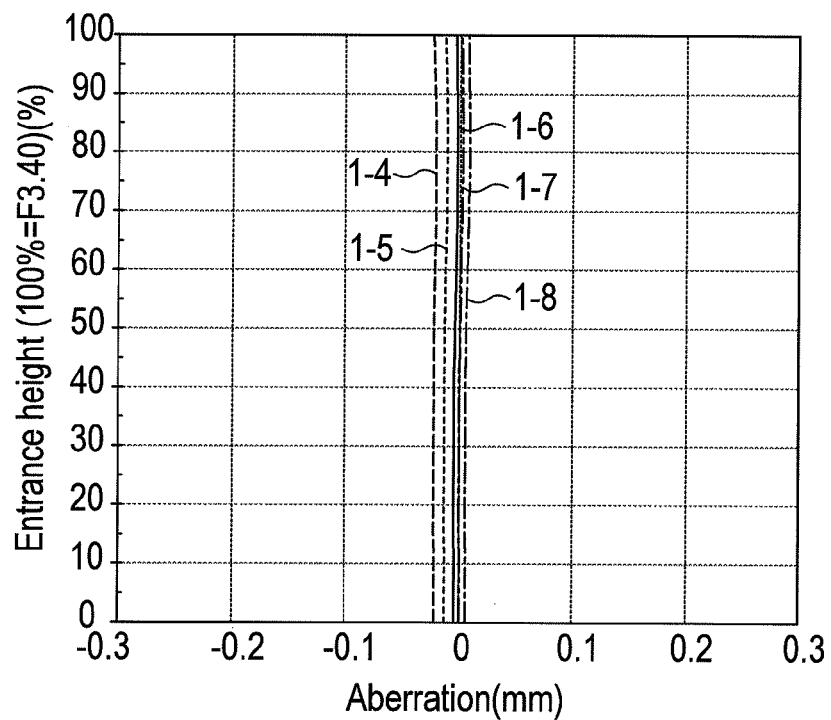
FIG. 5 is a diagram depicting the chromatic/spherical aberration of the imaging lens of Embodiment 1.

FIG. 3 shows a graph of the distortion aberration curve 1-1, FIG. 4 shows a graph of the astigmatism aberration curve (aberration curve 1-2 on the meridional surface and aberration curve 1-3 on the sagittal surface), and FIG. 5 shows a graph of a chromatic/spherical aberration curve (aberration curve 1-4 on g-line, aberration curve 1-5 on F-line, aberration curve 1-6 on e-line, aberration curve 1-7 on d-line, and aberration curve 1-8 on C-line).

The ordinates of the aberration curves in FIG. 3 and FIG. 4 show the image height by a % of the distance from the optical axis. In FIG. 3 and FIG. 4, 100% corresponds to 0.586 mm. The ordinate of the aberration curve in FIG. 5 shows the entrance height h (F number), and the maximum thereof corresponds to 3.40. The abscissa of FIG. 3 shows the aberration (%), and the abscissas of FIG. 4 and FIG. 5 show the value of the aberration (mm).

For the distortion aberration, the absolute value of the aberration is 5.41%, which is the maximum, at the position of 100% image height (image height: 0.586 mm), and the absolute value of the aberration is within 5.41% in a range where the image height is 0.586 mm or less.

For the astigmatism aberration, the absolute value of the aberration on the meridional surface is 0.0675 mm, which is the maximum, at the position of 100% image height (image height: 0.586 mm), and the absolute value of the aberration is within 0.0675 mm in a range where the image height is 0.586 mm or less.

For the chromatic/spherical aberration, the absolute value of the aberration curve 1-4 on the g-line is 0.0234 mm, which is the maximum, at 100% entrance height h, and the absolute value of the aberration is within 0.0234 mm.

Therefore according to the imaging lens of Embodiment 1, the optical length can be short enough to be installed in a portable telephone, the back focus can be long enough to insert such components as a filter and cover glass between the imaging lens and the image sensing plane, and good images can be acquired.

Embodiment 2

Embodiment 2 is an embodiment of the second imaging lens of the present invention, where the first lens $L_1$, the third lens $L_3$, the fourth lens $L_4$, the sixth lens $L_6$, the seventh lens $L_7$ and the ninth lens $L_9$ are formed of a transparent curable silicone resin SMX-7852 (made by Fuji Polymer Industries Co. Ltd.), and the second lens $L_2$, the fifth lens $L_5$ and the eighth lens $L_8$ are formed of optical glass BK7 (made by Ohara Inc.)

The respective composing materials of the first to the ninth lens are the same as the above mentioned Embodiment 1, therefore $|N_2-N_1|=|N_2-N_3|=|N_5-N_4|=|N_5-N_6|=|N_8-N_7|=|N_8-N_9|=0.00633$, which satisfies the following Conditions (1), (2), (5), (6), (9) and (10). Also $|v_2-v_1|=|v_2-v_3|=|v_5-v_4|=|v_5-v_6|=|v_8-v_7|=|v_8-v_9|=8.0$, which satisfies the following Conditions (3), (4), (7), (8), (11) and (12).

Figure 7:
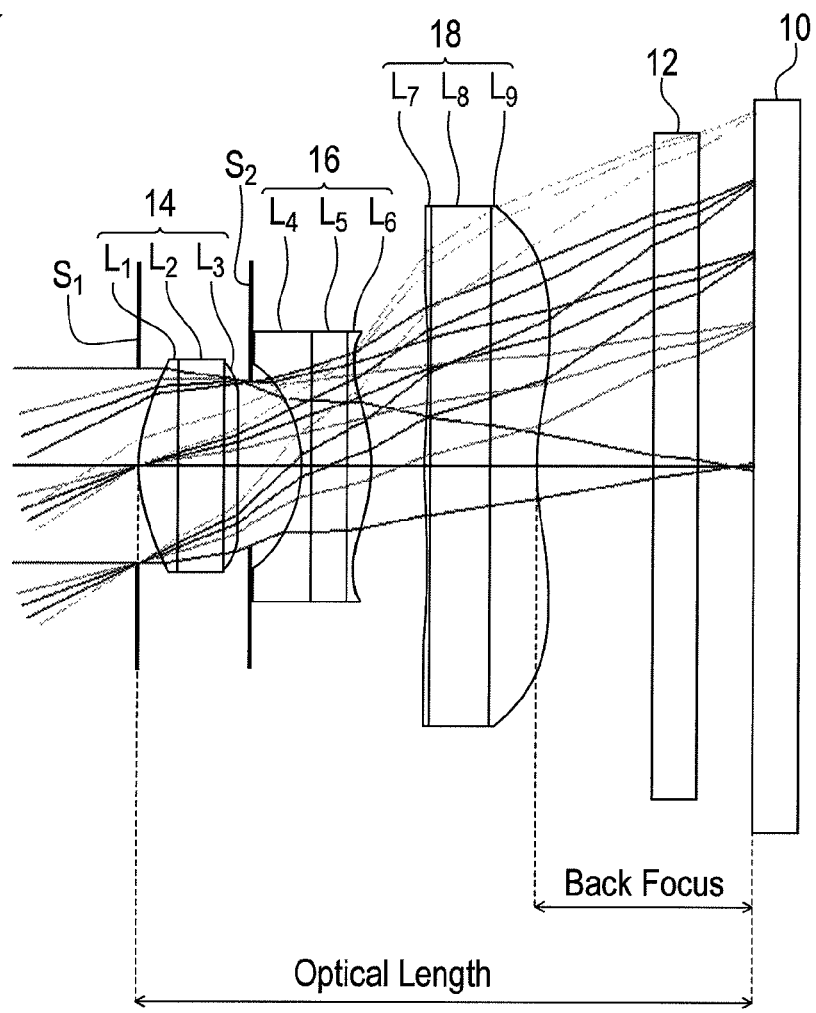
FIG. 7 is a cross-sectional view depicting an imaging lens according to Embodiment 2.

FIG. 7 is a cross-sectional view of the imaging lens of Embodiment 2. As FIG. 7 shows, the first stop $S_1$, to play a role of an aperture stop, is formed at a position of an intersection of the first surface (surface at the object side) of the first lens $L_1$ constituting the first junction type compound lens 14 and the optical axis. The second stop $S_2$, to play a role of preventing a flare or smear, is formed between the first junction type compound lens 14 and the second junction type compound lens 16.

The stop surface of the first stop $S_1$ is a plane $r_1$, so $r_1 = \infty$ is indicated in Table 2. The second stop $S_2$ is comprised of a plane $r_6$, so $r_6 = \infty$ is indicated in Table 2. The F number Fno is 2.90.

As Table 2 shows, $r_3 = \infty$ and $r_4 = \infty$, so the second lens $L_2$ is an optical-parallel plate, $r_8 = \infty$ and $r_9 = \infty$, so the fifth lens $L_5$ is an optical-parallel plate, and $r_{12} = \infty$ and $r_{13} = \infty$, so the eighth lens $L_8$ is an optical-parallel plate.

Further, $r_2$ is a positive value and $r_5$ is a negative value, so the first lens $L_1$ is a plano-convex lens where the object side face of this first lens $L_1$ is a convex surface facing the object side on a paraxial line, and the third lens $L_3$ is a plano-convex lens where the image side face of this third lens $L_3$ is a convex surface facing the image side on a paraxial line. $r_7$ is a negative value and $r_{10}$ is also a negative value, so the fourth lens $L_4$ is a plano-concave lens where the object side face of this fourth lens $L_4$ is a concave surface facing the object side on a paraxial line, and the sixth lens $L_6$ is a plano-convex lens where the image side face of this sixth lens $L_6$ is a convex surface facing the image side on a paraxial line. $r_{11}$ is a positive value and $r_{14}$ is also a positive value, so the seventh lens $L_7$ is a plano-convex lens where the object side face of this seventh lens $L_7$ is a convex surface facing the object side, and the ninth lens $L_9$ is a plano-concave lens where the image side face of this ninth lens $L_9$ is a concave surface facing the image side on a paraxial line.

In Embodiment 2, the optical length L with respect to the focal distance f=1.00 mm is 1.079 mm, and the back focus bf is 0.352 mm.

Figure 8:
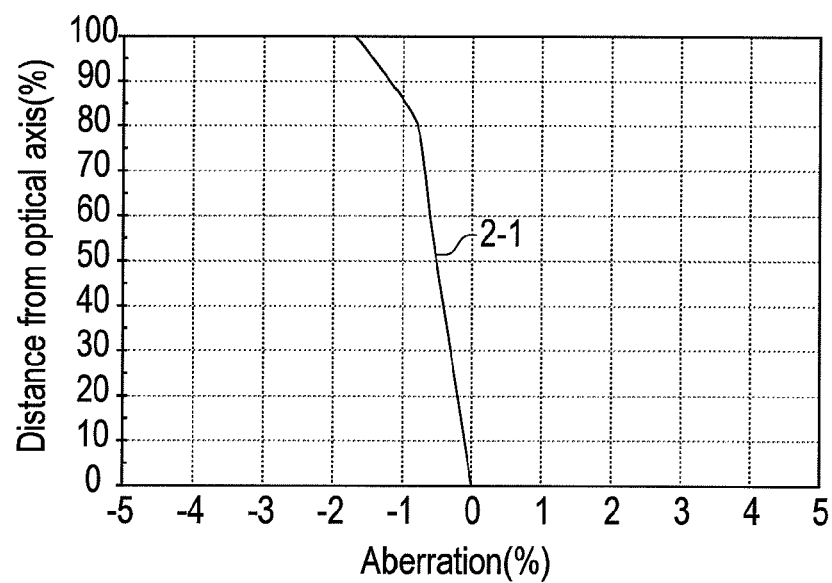
FIG. 8 is a diagram depicting the distortion aberration of the imaging lens of Embodiment 2.
Figure 9:
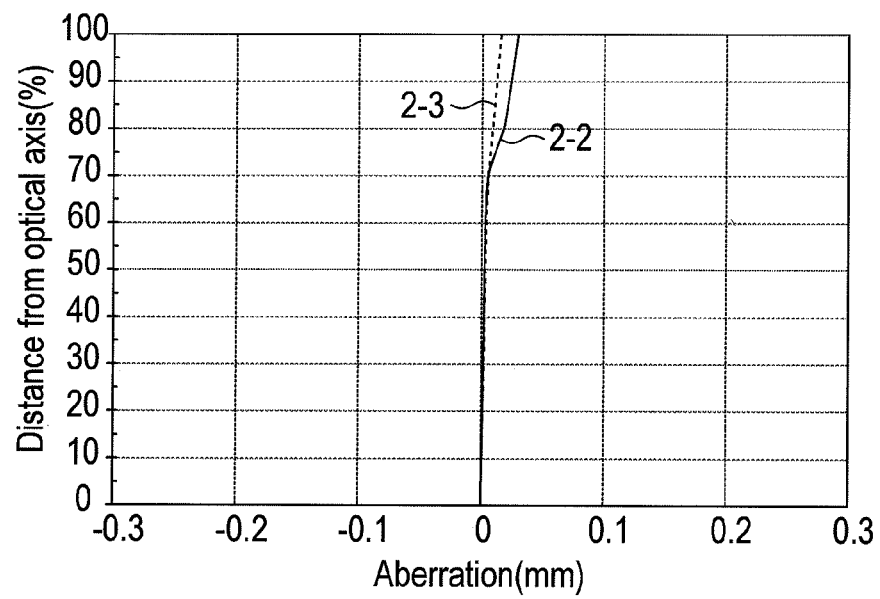
FIG. 9 is a diagram depicting the astigmatism aberration of the imaging lens of Embodiment 2.
Figure 10:
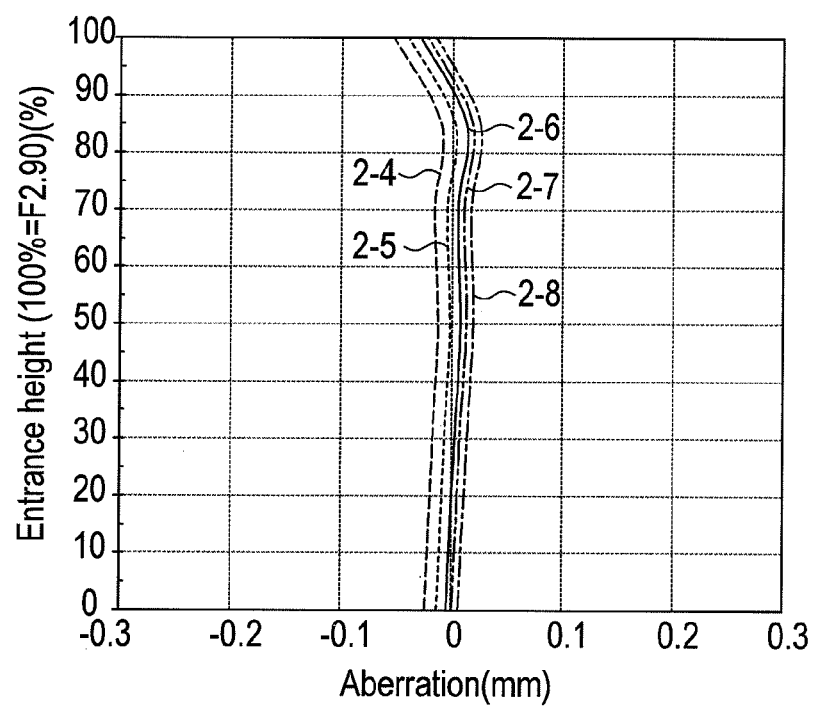
FIG. 10 is a diagram depicting the chromatic/spherical aberration of the imaging lens of Embodiment 2.

FIG. 8 shows a graph of the distortion aberration curve 2-1, FIG. 9 shows a graph of the astigmatism aberration curve (aberration curve 2-2 on the meridional surface and aberration curve 2-3 on the sagittal surface), and FIG. 10 shows a graph of a chromatic/spherical aberration curve (aberration curve 2-4 on g-line, aberration curve 2-5 on F-line, aberration curve 2-6 on e-line, aberration curve 2-7 on d-line, and aberration curve 2-8 on C-line).

The ordinates of the aberration curves in FIG. 8 and FIG. 9 show the image height by a % of the distance from the optical axis. In FIG. 8 and FIG. 9, 100% corresponds to 0.630 mm. The ordinate of the aberration curve in FIG. 10 shows the entrance height h (F number), and the maximum thereof corresponds to 2.90. The abscissa of FIG. 8 shows the aberration (%), and the abscissa of FIG. 9 and FIG. 10 show the value of the aberration (mm).

For the distortion aberration, the absolute value of the aberration is 1.68%, which is the maximum, at the position of 100% image height (image height: 0.630 mm), and the absolute value of the aberration is within 1.68% in a range where the image height is 0.630 mm or less.

For the astigmatism aberration, the absolute value of the aberration on the meridional surface is 0.0292 mm, which is the maximum, at the position of 100% image height (image height: 0.630 mm), and the absolute value of the aberration is within 0.0292 mm in a range where the image height is 0.630 mm or less.

For the chromatic/spherical aberration, the absolute value of the aberration curve 2-4 on the g-line is 0.0534 mm, which is the maximum, at 100% entrance height h, and the absolute value of the aberration is within 0.0534 mm.

Therefore according to the imaging lens of Embodiment 2, the optical length can be short enough to be installed in a portable telephone, the back focus can be long enough to insert such components as a filter and cover glass between the imaging lens and the image sensing plane, and good images can be. acquired.

Embodiment 3

Embodiment 3 is an embodiment of the second imaging lens of the present invention, wherein the first lens $L_1$, the third lens $L_3$, the seventh lens $L_7$, and the ninth lens $L_9$ are formed of transparent curable silicone resin SR-7010 (made by Dow Corning Toray Co., Ltd.), the second lens $L_2$ and the eighth lens $L_8$ are formed of optical glass BK7 (made by Ohara Inc.), and the fifth lens $L_5$ is formed of optical glass E-F5 (made by Hoya Corp). And the fourth lens $L_4$ and the sixth lens $L_6$ are formed of transparent curable silicone resin SMX-7877 (made by Fuji Polymer Industries Co. Ltd)).
(A) The refractive index $N_1$ of the first lens $L_1$ is $N_1$=1.53000.
(B) The refractive index $N_2$ of the second lens $L_2$ is $N_2$=1.51633.
(C) The refractive index $N_3$ of the third lens $L_3$ is $N_3$=1.53000.
(D) The Abbe number $v_1$ of the first lens $L_1$ is $v_1$=35.0.
(E) The Abbe number $v_2$ of the second lens $L_2$ is $v_2$=64.0.
(F) The Abbe number $v_3$ of the third lens $L_3$ is $v_3$=35.0.
(G) The refractive index $N_4$ of the fourth lens $L_4$ is $N_4$=1.60000.
(H) The refractive index $N_5$ of the fifth lens $L_5$ is $N_5$=1.60342.
(I) The refractive index $N_6$ of the sixth lens $L_6$ is $N_6$=1.60000.
(J) The Abbe number $v_4$ of the fourth lens $L_4$ is $v_4$=30.0.
(K) The Abbe number $v_5$ of the fifth lens $L_5$ is $v_5$=38.0.
(L) The Abbe number $v_6$ of the sixth lens $L_6$ is $v_6$=30.0.
(M) The refractive index $N_7$ of the seventh lens $L_7$ is $N_7$=1.53000.
(N) The refractive index $N_8$ of the eighth lens $L_8$ is $N_8$=1.51633.
(O) The refractive index $N_9$ of the ninth lens $L_9$ is $N_9$=1.53000.
(P) The Abbe number $v_7$ of the seventh lens $L_7$ is $v_7$=35.0.
(Q) The Abbe number $v_8$ of the eighth lens $L_8$ is $v_8$=64.0.
(R) The Abbe number $v_9$ of the ninth lens $L_9$ is $v_9$=35.0

Therefore $|N_2-N_1|=|N_2-N_3|=|N_8-N_7|=|N_8-N_9|=0.01367$, and $|N_5-N_4|=|N_5-N_6|=0.00342$, which satisfies the following Conditions (1), (2), (5), (6), (9) and (10). Also $|v_2-v_1|=|v_2-v_3|=|v_8-v_7|=|v_8-v_9|=29.0$ and $|v_5-v_4|=|v_5-v_6|=8.0$, which satisfies the following Conditions (3), (4), (7), (8), (11) and (12).

Figure 11:
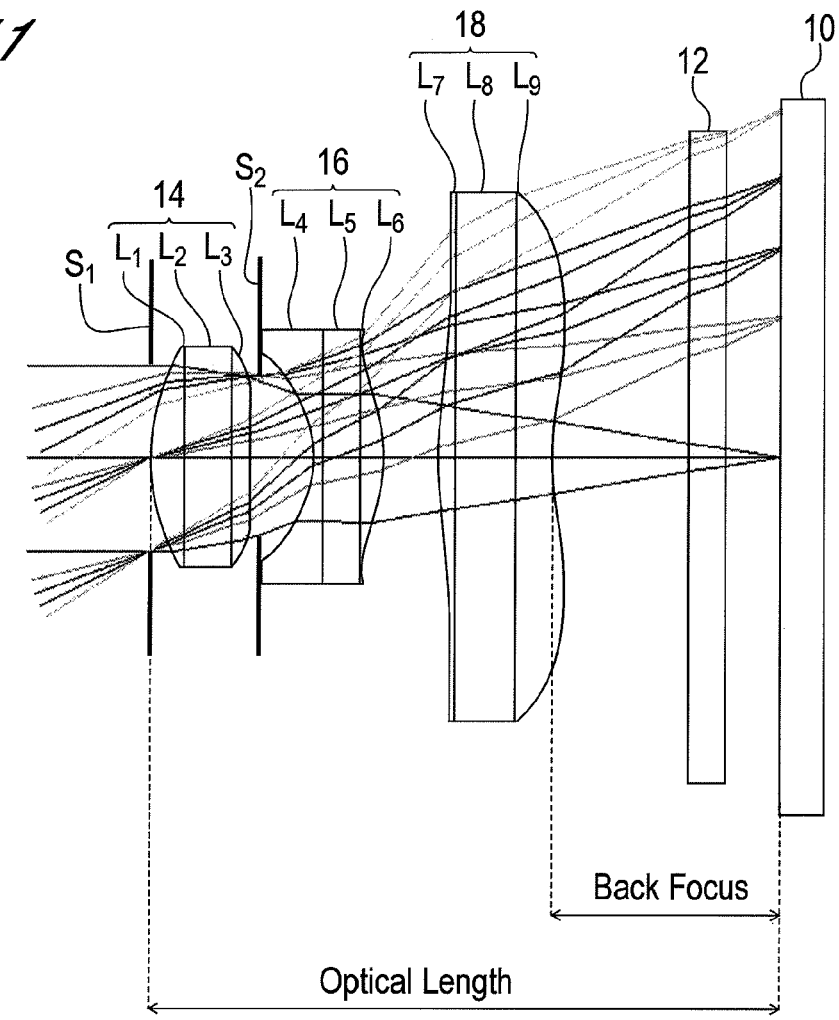
FIG. 11 is a cross-sectional view depicting an imaging lens according to Embodiment 3.

FIG. 11 is a cross-sectional view of the imaging lens of Embodiment 3. As FIG. 11 shows, the first stop $S_1$, to play a role of an aperture stop, is formed at a position of an intersection of the first surface (surface at the object side) of the first lens $L_1$ constituting the first junction type compound lens 14 and the optical axis. The second stop $S_2$, to play a role of preventing a flare or smear, is formed between the first junction type compound lens 14 and the second junction type compound lens 16.

The stop surface of the first stop $S_1$ is a plane $r_i$, so $r_1=\infty$ is indicated in Table 3. The second stop $S_2$ is comprised of a plane $r_6$, so $r_6=\infty$ is indicated in Table 3. The F number Fno is 2.96.

As Table 3 shows, $r_3=\infty$ and $r_4=\infty$, so the second lens $L_2$ is an optical-parallel plate, $r_8=\infty$ and $r_9=\infty$, so the fifth lens $L_5$ is an optical-parallel plate, and $r_{12}=\infty$ and $r_{13}=\infty$, so the eighth lens $L_8$ is an optical-parallel plate.

Further, $r_2$ is a positive value and $r_5$ is a positive value, so the first lens $L_1$ is a plano-convex lens where the object side face of this first lens $L_1$ is a convex surface facing the object side on a paraxial line, and the third lens $L_3$ is a plano-convex lens where the image side face of this third lens $L_3$ is a convex surface facing the image side on a paraxial line. $r_7$ is a negative value and $r_{10}$ is also a negative value, so the fourth lens $L_4$ is a plano-concave lens where the object side face of this fourth lens $L_4$ is a concave surface facing the object side on a paraxial line, and the sixth lens $L_6$ is a plano-convex lens where the image side face of this sixth lens $L_6$ is a convex surface facing the image side on a paraxial line. $r_{11}$ is a positive value and $r_{14}$ is also a positive value, so the seventh lens $L_7$ is a plano-convex lens where the object side face of this seventh lens $L_7$ is a convex surface facing the object side, and the ninth lens $L_9$ is a plano-concave lens where the image side face of this ninth lens $L_9$ is a concave surface facing the image side on a paraxial line.

In Embodiment 3, the optical length L with respect to the focal distance f=1.00 mm is 1.137 mm, and the back focus bf is 0.391 mm.

Figure 12:
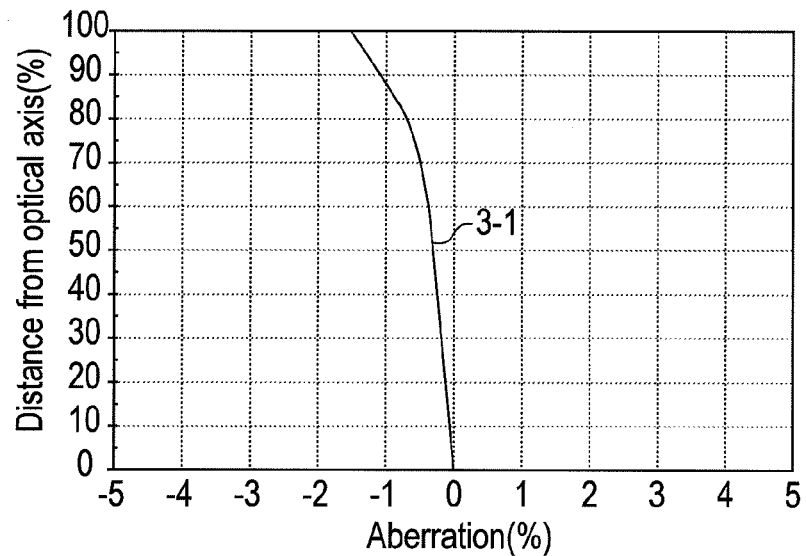
FIG. 12 is a diagram depicting the distortion aberration of the imaging lens of Embodiment 3.
Figure 13:
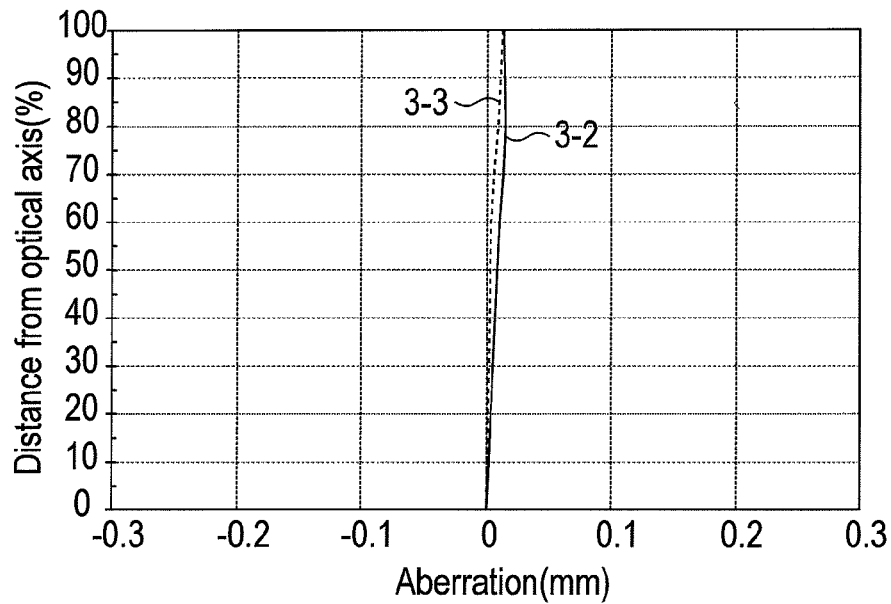
FIG. 13 is a diagram depicting the astigmatism aberration of the imaging lens of Embodiment 3.
Figure 14:
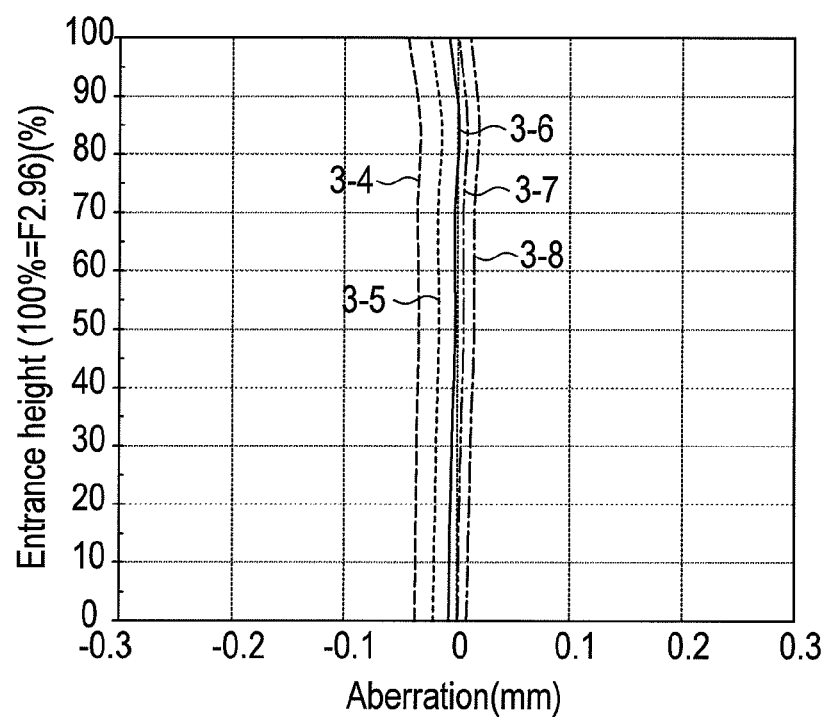
FIG. 14 is a diagram depicting the chromatic/spherical aberration of the imaging lens of Embodiment 3.

FIG. 12 shows a graph of the distortion aberration curve 3-1, FIG. 13 shows a graph of the astigmatism aberration curve (aberration curve 3-2 on the meridional surface and aberration curve 3-3 on the sagittal surface), and FIG. 14 shows a graph of a chromatic/spherical aberration curve (aberration curve 3-4 on g-line, aberration curve 3-5 on F-line, aberration curve 3-6 on e-line, aberration curve 3-7 on d-line, and aberration curve 3-8 on C-line).

The ordinates of the aberration curves in FIG. 12 and FIG. 13 show the image height by a % of the distance from the optical axis. In FIG. 12 and FIG. 13, 100% corresponds to 0.631 mm. The ordinate of the aberration curve in FIG. 14 shows the entrance height h (F number), and the maximum thereof corresponds to 2.96. The abscissa of FIG. 12 shows the aberration (%), and the abscissa of FIG. 13 and FIG. 14 show the value of the aberration (mm).

For the distortion aberration, the absolute value of the aberration is 1.52%, which is the maximum, at the position of 100% image height (image height: 0.631 mm), and the absolute value of the aberration is within 1.52% in a range where the image height is 0.631 mm or less.

For the astigmatism aberration, the absolute value of the aberration on the meridional surface is 0.0147 mm, which is the maximum, at the position of 80% image height (image height: 0.505 mm), and the absolute value of the aberration is within 0.0147 mm in a range where the image height is 0.631 mm or less.

For the chromatic/spherical aberration, the absolute value of the aberration curve 3-4 on the g-line is 0.435 mm, which is the maximum, at 100% entrance height h, and the absolute value of the aberration is within 0.0435 mm.

Therefore according to the imaging lens of Embodiment 3, the optical length can be short enough to be installed in a portable telephone, the back focus can be long enough to insert such components as a filter and cover glass between the imaging lens and the image sensing plane, and good images can be acquired.

Embodiment 4

Embodiment 4 is an embodiment of the first imaging lens of the present invention, wherein the first lens $L_1$, the third lens $L_3$, the fourth lens $L_4$, the sixth lens $L_6$, the seventh lens $L_7$ and the ninth lens $L_9$ are formed of a transparent curable silicone resin SMX-7852 (made by Fuji Polymer Industries Co. Ltd.), and the second lens $L_2$, the fifth lens $L_5$ and the eighth lens $L_8$ are formed of optical glass BK7 (made by Ohara Inc.).

The respective composing materials of the first to the ninth lens are the same as the above mentioned Embodiments 1 and 2, therefore $|N_2-N_1|=|N_2-N_3|=|N_5-N_4|=|N_5-N_6|=|N_8-N_7|=|N_8-N_9|=0.00633$, which satisfies the following Conditions (1), (2), (5), (6), (9) and (10). Also $|v_2-v_1|=|v_2-v_3|=|v_5-v_4|=|v_5-v_6|=|v_8-v_7|=|v_8-v_9|=8.0$, which satisfies the following Conditions (3), (4), (7), (8), (11) and (12).

Figure 15:
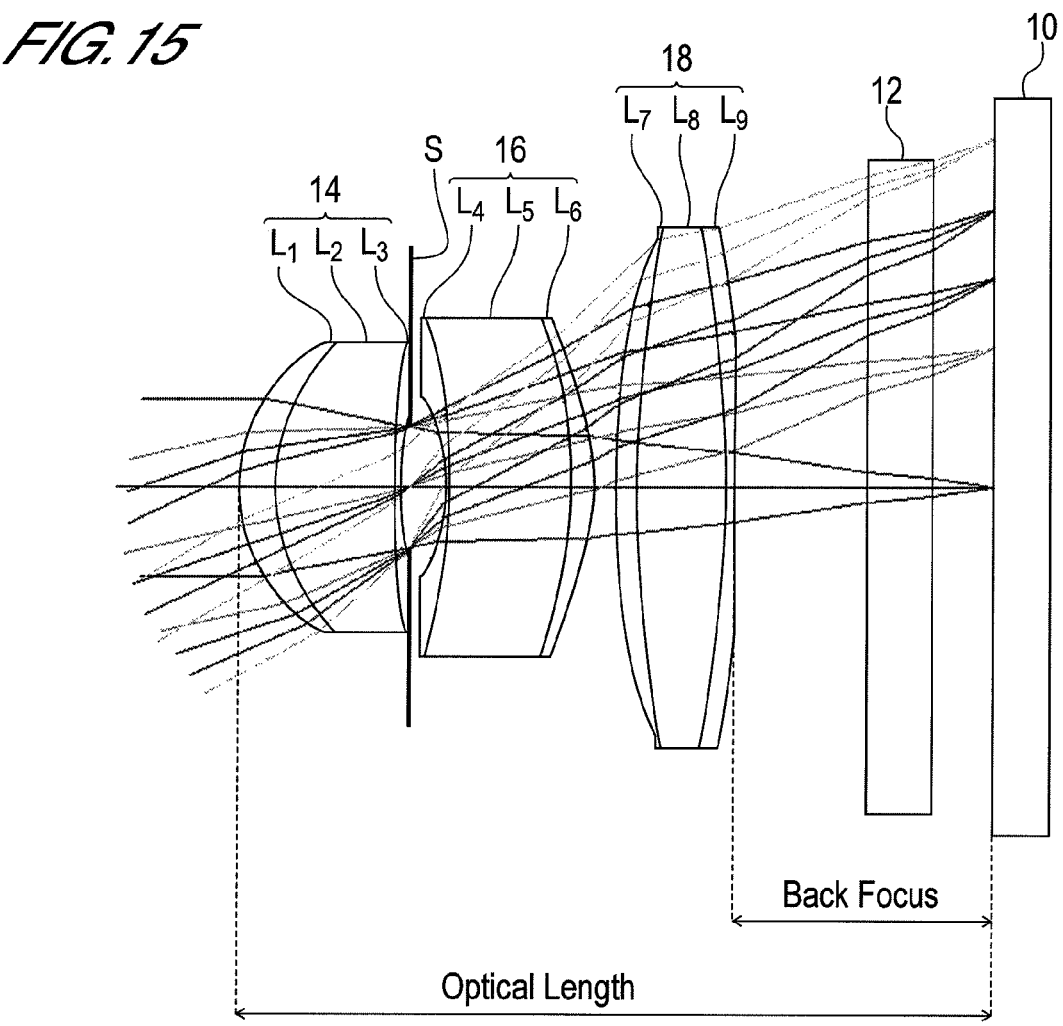
FIG. 15 is a cross-sectional view depicting an imaging lens according to Embodiment 4.

FIG. 15 is a cross-sectional view of the imaging lens of Embodiment 4. As FIG. 15 shows, the aperture stop S is formed between the first junction type compound lens 14 and the second junction type compound lens 16. The stop surface of the aperture stop S is a plane, so $r_5=\infty$ is indicated in Table 4. The F number Fno is 3.40.

As Table 4 shows, $r_2$ is a positive value and $r_3$ is also a positive value, so the second lens $L_2$ is a meniscus lens of which convex surface is facing the object side, $r_7$ is a negative value and $r_8$ is also a negative value, so the fifth lens $L_5$ is a meniscus lens of which convex surface is facing the image side, and $r_{11}$ is a positive value and $r_{12}$ is a negative value, so the eighth lens $L_8$ is a biconvex lens of which both side faces are convex surfaces.

$r_1$ is a positive value, so the first lens $L_1$ is a lens where the object side face of this first lens $L_1$ is a convex surface facing the object side on a paraxial line. $r_4$ is a positive value, so the third lens $L_3$ is a lens where the image side face of this third lens $L_3$ is a concave surface facing the image side on a paraxial line.

$r_6$ is a negative value, so the fourth lens $L_4$ is a lens where the object side face of this fourth lens $L_4$ is a concave surface facing the object side on a paraxial line. $r_9$ is a negative value, so the sixth lens $L_6$ is a lens where the image side face of this sixth lens $L_6$ is a convex surface facing the image side on a paraxial line.

$r_{10}$ is a positive value, so the seventh lens $L_7$ is a lens where the object side face of this seventh lens $L_7$ is a convex surface facing the object side on a paraxial line. $r_{13}$ is a positive value, so the ninth lens $L_9$ is a lens where the image side face of this ninth lens $L_9$ is a concave surface facing the image side on a paraxial line.

In Embodiment 4, the optical length L with respect to the focal distance f=1.00 mm is 1.235 mm, and the back focus bf is 0.391 mm.

Figure 16:
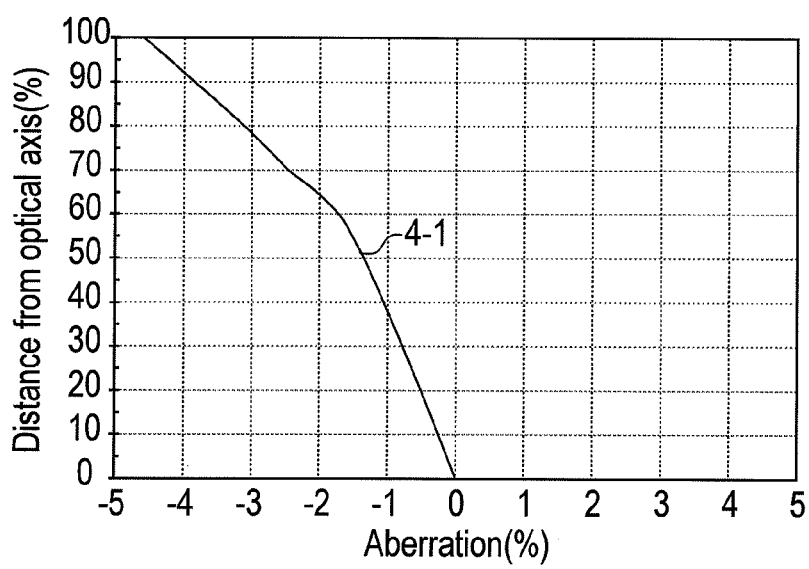
FIG. 16 is a diagram depicting the distortion aberration of the imaging lens of Embodiment 4.
Figure 17:
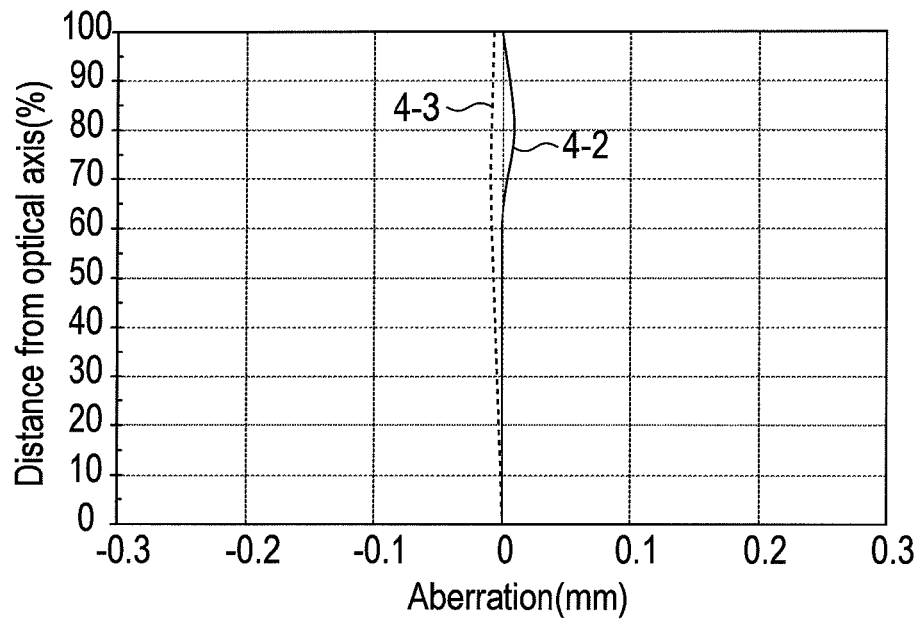
FIG. 17 is a diagram depicting the astigmatism aberration of the imaging lens of Embodiment 4.
Figure 18:
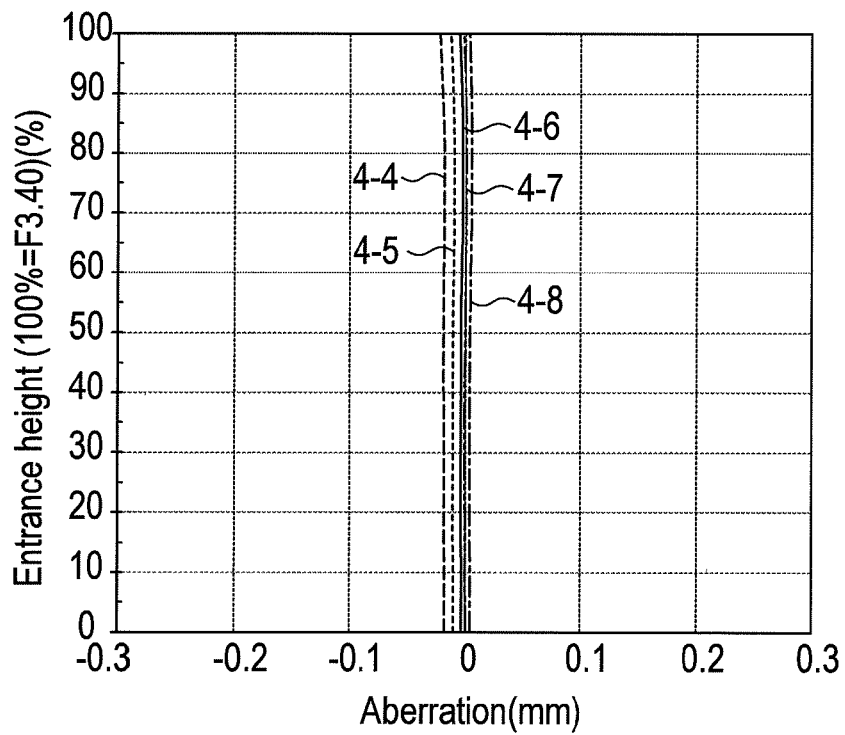
FIG. 18 is a diagram depicting the chromatic/spherical aberration of the imaging lens of Embodiment 4.

FIG. 16 shows a graph of the distortion aberration curve 4-1, FIG. 17 shows a graph of the astigmatism aberration curve (aberration curve 4-2 on the meridional surface and aberration curve 4-3 on the sagittal surface), and FIG. 18 shows a graph of a chromatic/spherical aberration curve (aberration curve 4-4 on g-line, aberration curve 4-5 on F-line, aberration curve 4-6 on e-line, aberration curve 4-7 on d-line, and aberration curve 4-8 on C-line).

The ordinates of the aberration curves in FIG. 16 and FIG. 17 show the image height by a % of the distance from the optical axis. In FIG. 16 and FIG. 17, 100% corresponds to 0.572 mm. The ordinate of the aberration curve in FIG. 18 shows the entrance height h (F number), and the maximum thereof corresponds to 3.40. The abscissa of FIG. 16 shows the aberration (%), and the abscissa of FIG. 17 and FIG. 18 show the value of the aberration (mm).

For the distortion aberration, the absolute value of the aberration is 4.58%, which is the maximum, at the position of 100% image height (image height: 0.572 mm), and the absolute value of the aberration is within 4.58% in a range where the image height is 0.572 mm or less.

For the astigmatism aberration, the absolute value of the aberration on the sagittal surface is 0.0098 mm, which is the maximum, at the position of 70% image height (image height: 0.400 mm), and the absolute value of the aberration is within 0.0098 mm in a range where the image height is 0.572 mm or less. For the chromatic/spherical aberration, the absolute value of the aberration curve 4-4 on the g-line is 0.0221 mm, which is the maximum, at 100% entrance height h, and the absolute value of the aberration is within 0.0221 mm.

Therefore according to the imaging lens of Embodiment 4, the optical length can be short enough to be installed in a portable telephone, the back focus can be long enough to insert such components as a filter and covering glass between the imaging lens and the image sensing plane, and good images can be acquired.

Embodiment 5

Embodiment 5 is an embodiment of the second imaging lens of the present invention, where the first lens $L_1$, the third lens $L_3$, the fourth lens $T_4$, the sixth lens $L_6$, the seventh lens $L_7$ and the ninth lens $L_9$ are formed of a transparent curable silicone resin SMX-7852 (made by Fuji Polymer Industries Co. Ltd.), and the second lens $L_2$, the fifth lens $L_5$ and the eighth lens $L_8$ are formed of optical glass BK7 (made by Ohara Inc.)

The respective composing materials of the first to the ninth lens are the same as the above mentioned Embodiments 1, 2 and 4, therefore $|N_2-N_1|=|N_2-N_3|=|N_5-N_4|=|N_5-N_6|=|N_8-N_7|=|N_8-N_9|=0.00633$, which satisfies the following Conditions (1), (2), (5), (6), (9) and (10). Also $|v_2-v_1|=|v_2-v_3|=|v_5-v_4|=|v_5-v_6|=|v_s-v_7|=|v_8-v_9|=8.0$, which satisfies the following Conditions (3), (4), (7), (8), (11) and (12).

Figure 19:
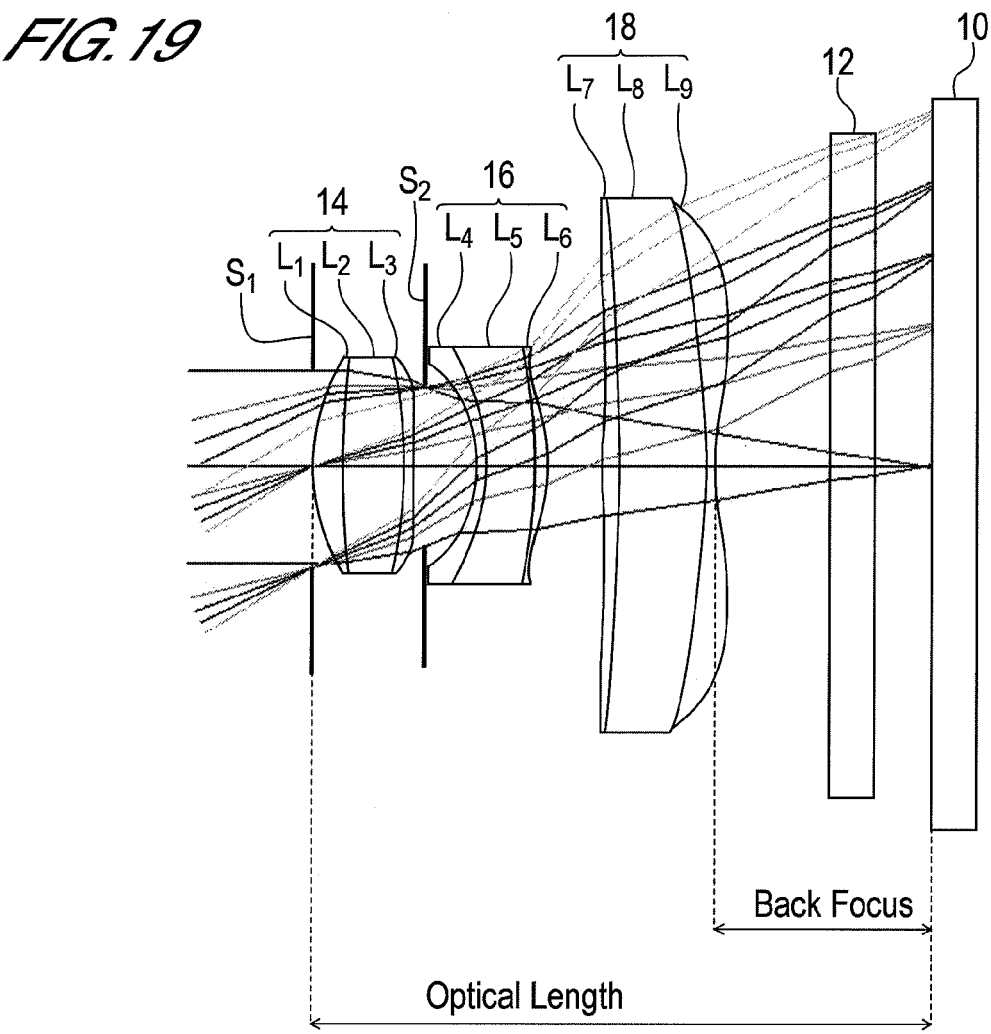
FIG. 19 is a cross-sectional view depicting an imaging lens according to Embodiment 5.

FIG. 19 is a cross-sectional view of the imaging lens of Embodiment 5. As FIG. 19 shows, the first stop $S_1$, to play a role of an aperture stop, is formed at a position of an intersection of the first surface (surface at the object side) of the first lens $L_1$ constituting the first junction type compound lens 14 and the optical axis. The second stop $S_2$, to play a role of preventing a flare or smear, is formed between the first junction type compound lens 14 and the second junction type compound lens 16.

The stop surface of the first stop $S_1$ is a plane $r_1$, so $r_1=\infty$ is indicated in Table 5. The second stop $S_2$ is comprised of a plane $r_6$, so $r_6=\infty$ is indicated in Table 5. The F number Fno is 2.80.

As Table 5 shows, $r_3$ is a positive value and $r_4$ is a negative value, so the second lens $L_2$ is a biconvex lens of which both side surfaces are convex surfaces, $r_7$ is a negative value and $r_8$ is also a negative value, so the fifth lens $L_5$ is a meniscus lens of which convex surface is facing the image side, and $r_{12}$ is a negative value and $r_{13}$ is also a negative value, so the eighth lens $L_8$ is a meniscus lens of which convex surface is facing the image side.

$r_2$ is a positive value, so the first lens $L_1$ is a lens where the object side face of this first lens $L_1$ is a convex surface facing the object side on a paraxial line. $r_5$ is a negative value, so the third lens $L_3$ is a lens where the image side face of this third lens $L_3$ is a convex surface facing the image side on a paraxial line.

$r_7$ is a negative value, so the fourth lens $L_4$ is a lens where the object side face of this fourth lens $L_4$ is a concave surface facing the object side on a paraxial line. $r_{10}$ is a negative value, so the sixth lens $L_6$ is a lens where the image side face of this sixth lens $L_6$ is a convex surface facing the image side on a paraxial line.

$r_{11}$ is a positive value, so the seventh lens $L_7$ is a lens where the object side face of this seventh lens $L_7$ is a convex $r_{14}$ is a positive value, so the ninth lens $L_9$ is a lens where the image side face of this ninth lens $L_9$ is a concave surface facing the image side on a paraxial line.

In Embodiment 5, the optical length L with respect to the focal distance f=1.00 mm is 1.079 mm, and the back focus bf is 0.350 mm.

Figure 20:
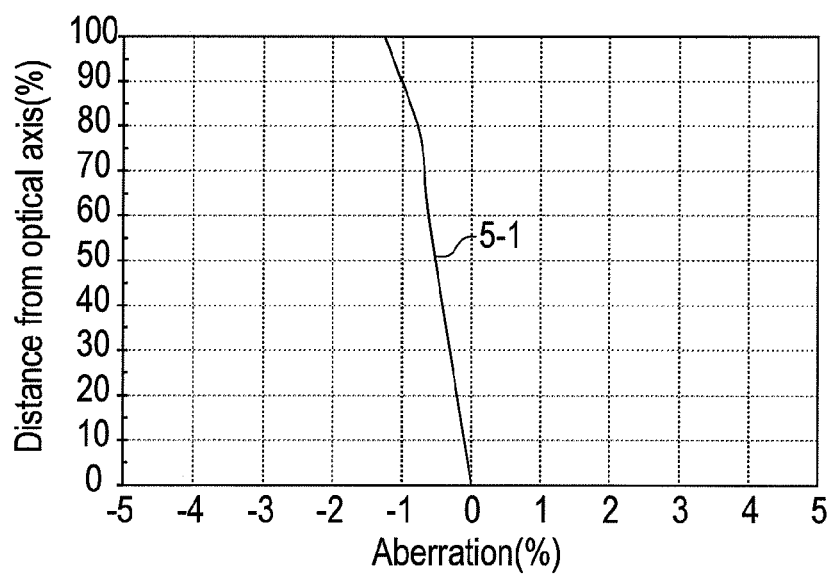
FIG. 20 is a diagram depicting the distortion aberration of the imaging lens of Embodiment 5.
Figure 21:
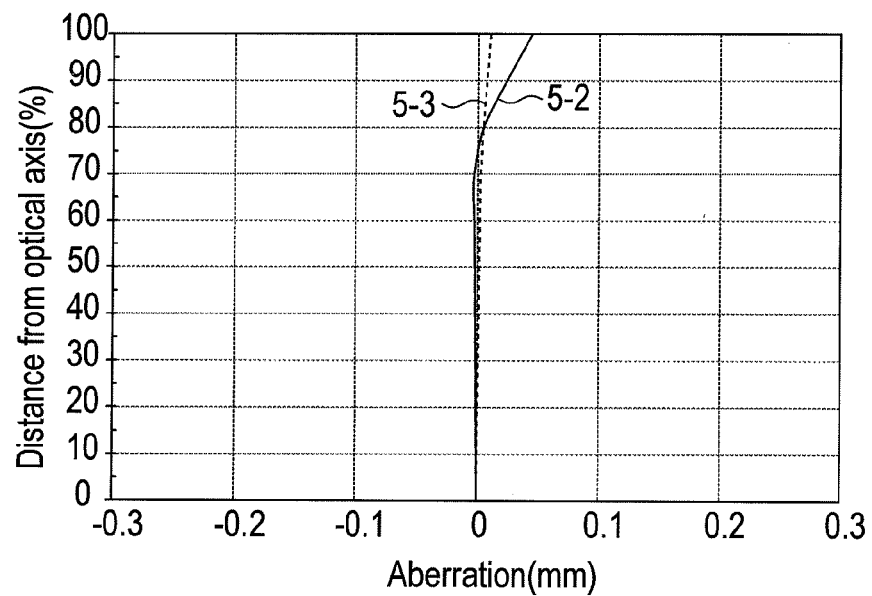
FIG. 21 is a diagram depicting the astigmatism aberration of the imaging lens of Embodiment 5.
Figure 22:
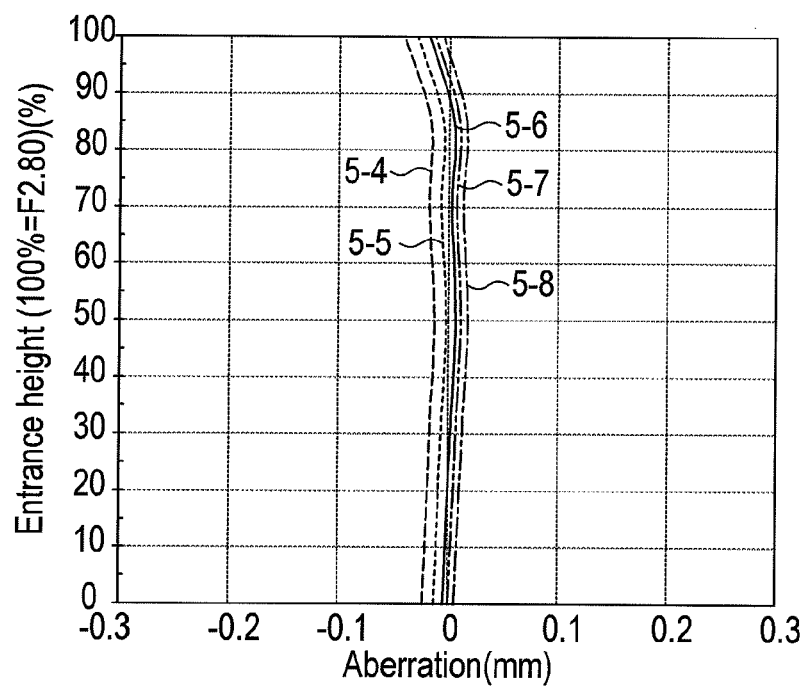
FIG. 22 is a diagram depicting the chromatic/spherical aberration of the imaging lens of Embodiment 5.

FIG. 20 shows a graph of the distortion aberration curve 5-1, FIG. 21 shows a graph of the astigmatism aberration curve (aberration curve 5-2 on the meridional surface and aberration curve 5-3 on the sagittal surface), and FIG. 22 shows a graph of a chromatic/spherical aberration curve (aberration curve 5-4 on g-line, aberration curve 5-5 on F-line, aberration curve 5-6 on e-line, aberration curve 5-7 on d-line, and aberration curve 5-8 on C-line).

The ordinates of the aberration curves in FIG. 20 and FIG. 21 show the image height by a % of the distance from the optical axis. In FIG. 20 and FIG. 21, 100% corresponds to 0.620 mm. The ordinate of the aberration curve in FIG. 22 shows the entrance height h (F number), and the maximum thereof corresponds to 2.80. The abscissa of FIG. 20 shows the aberration (%), and the abscissa of FIG. 21 and FIG. 22 show the value of the aberration (mm).

For the distortion aberration, the absolute value of the aberration is 1.26%, which is the maximum, at the position of 100% image height (image height: 0.620 mm), and the absolute value of the aberration is within 1.26% in a range where the image height is 0.620 mm or less.

For the astigmatism aberration, the absolute value of the aberration on the meridional surface is 0.0444 mm, which is the maximum, at the position of 100% image height (image height: 0.620 mm), and the absolute value of the aberration is within 0.0444 mm in a range where the image height is 0.620 mm or less.

For the chromatic/spherical aberration, the absolute value of the aberration curve 5-4 on the g-line is 0.0416 mm, which is the maximum, at 100% entrance height h, and the absolute value of the aberration is within 0.0416 mm.

Therefore according to the imaging lens of Embodiment 5, the optical length can be short enough to be installed in a portable telephone, the back focus can be long enough to insert such components as a filter and covering glass between the imaging lens and the image sensing plane, and good images can be acquired.

Embodiment 6

Embodiment 6 is an embodiment of the first imaging lens of the present invention, wherein the first lens $L_1$, the third lens $L_3$, the fourth lens $L_4$, the sixth lens $L_6$, the seventh lens $L_7$ and the ninth lanes $L_9$ are formed of a transparent curable silicone resin SMX-7852 (made by Fuji Polymer Industries Co. Ltd.), and the second lens $L_2$, the fifth lens $L_5$ and the eighth lens $L_8$ are formed of a curable resin material Silplus MHD (made by Nippon Steel Chemical Co. Ltd.).

(A) The refractive index $N_1$ of the first lens $L_1$ is $N_1=1.51000$.
(B) The refractive index $N_2$ of the second lens $L_2$ is $N_2=1.51100$.
(C) The refractive index $N_3$ of the third lens $L_3$ is $N_3=1.51000$.
(D) The Abbe number $v_1$ of the first lens $L_1$ is $v_1=56.0$.
(E) The Abbe number $v_2$ of the second lens $L_2$ is $v_2=36.0$.
(F) The Abbe number $v_3$ of the third lens $L_3$ is $v_3=56.0$.
(G) The refractive index $N_4$ of the fourth lens $L_4$ is $N_4=1.51000$.
(H) The refractive index $N_5$ of the fifth lens $L_5$ is $N_5=1.51100$.
(I) The refractive index $N_6$ of the sixth lens $L_6$ is $N_6=1.51000$.
(J) The Abbe number $v_4$ of the fourth lens $L_4$ is $v_4=56.0$.
(K) The Abbe number $v_5$ of the fifth lens $L_5$ is $v_5=36.0$.
(L) The Abbe number $v_6$ of the sixth lens $L_6$ is $v_6=56.0$.
(M) The refractive index $N_7$ of the seventh lens $L_7$ is $N_7=1.51000$.
(N) The refractive index $N_8$ of the eighth lens $L_8$ is $N_8=1.51100$.
(O) The refractive index Ng of the ninth lens $L_9$ is $N_9=1.51000$.
(P) The Abbe number $v_7$ of the seventh lens $L_7$ is $v_7=56.0$.
(Q) The Abbe number $v_8$ of the eighth lens $L_8$ is $v_8=36.0$.
(R) The Abbe number $v_9$ of the ninth lens $L_9$ is $v_9=56.0$ Therefore $|N_2-N_1|=|N_2-N_3|=|N_5-N_4|=|N_5-N_6|=|N_8-N_7|=|N_8-N_9|=0.00100$, which satisfies the following Conditions (1), (2), (5), (6), (9) and (10). Also $|v_2-v_1|=|v_2-v_3|=|v_5-v_4|=|v_5-v_6|=|v_8-v_7|=|v_8-v_9|=20.0$, which satisfies the following Conditions (3), (4), (7), (8), (11) and (12).

Figure 23:
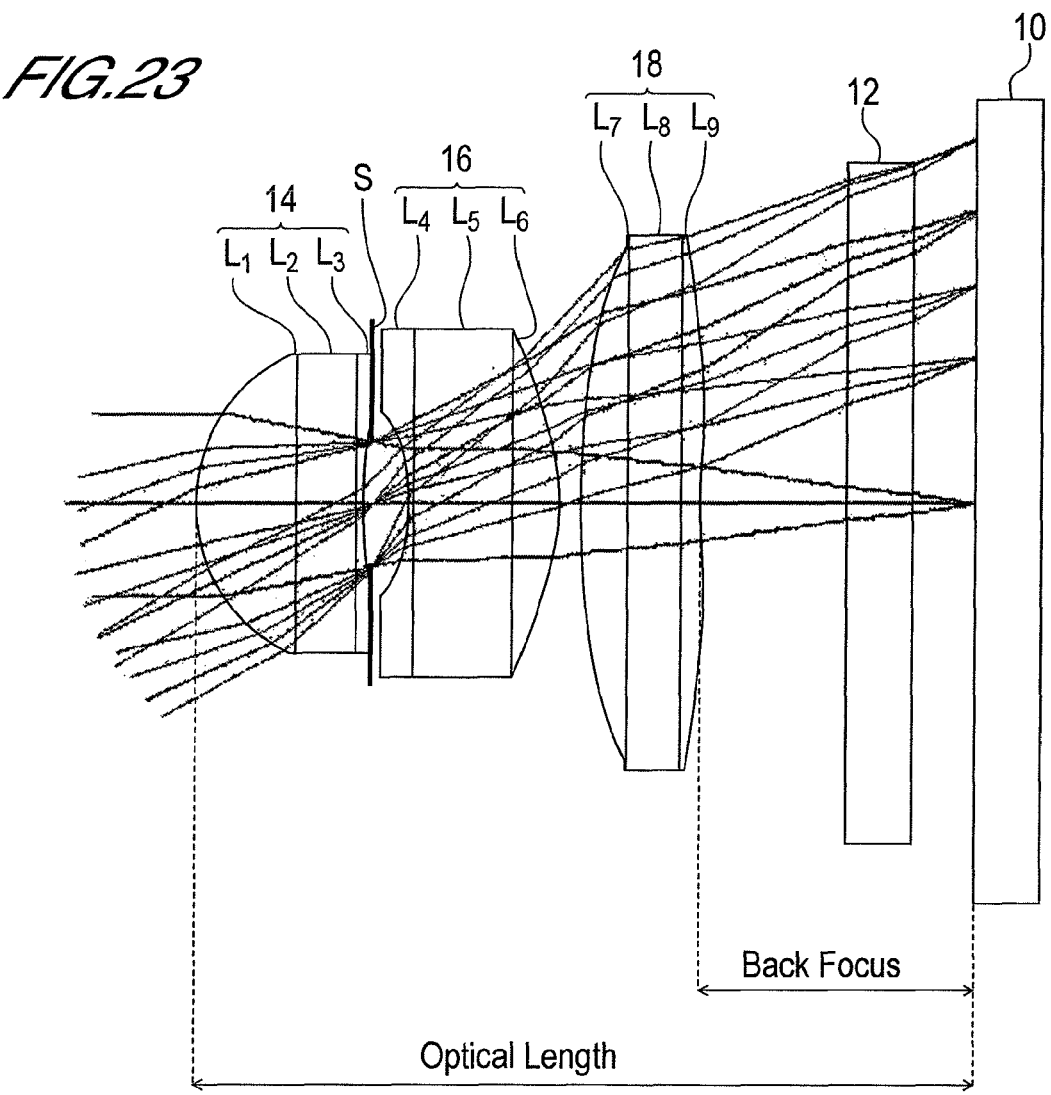
FIG. 23 is a cross-sectional view depicting an imaging lens according to Embodiment 6.

FIG. 23 is a cross-sectional view of the imaging lens of Embodiment 6. As FIG. 23 shows, the aperture stop S is formed between the first junction type compound lens 14 and the second junction type compound lens 16. The stop surface of the aperture stop S is a plane, so $r_5=\infty$ is indicated in Table 6. The F number Fno is 3.40.

As Table 6 shows, $r_2=\infty$ and $r_3=\infty$, so the second lens $L_2$ is an optical-parallel plate, $r_7=\infty$ and $r_8=\infty$, so the fifth lens $L_5$ is an optical-parallel plate, and $r_{11}=\infty$ and $r_{12}=\infty$, so the eighth lens $L_8$ is an optical-parallel plate.

$r_1$ is a positive value and $r_4$ is a positive value, so the first lens $L_1$ is a plano-convex lens where the object side face of this first lens $L_1$ is a convex surface facing the object side on a paraxial line, and the third lens $L_3$ is a plano-concave lens where the image side face of this third lens $L_3$ is a concave surface facing the image side on a paraxial line. $r_6$ is a negative value and $r_9$ is also a negative value, so the fourth lens $L_4$ is a plano-concave lens where the object side face of this fourth lens $L_4$ is a concave surface facing the object side on a paraxial line, and the sixth lens $L_6$ is a plano-convex lens where the image side face of this sixth lens $L_6$ is a convex surface facing the image side on a paraxial line. $r_{10}$ is a positive value and $r_{13}$ is also a positive value, so the seventh lens $L_7$ is a plano-convex lens where the object side face of this seventh lens $L_7$ is a convex surface facing the object side, and the ninth lens $L_9$ is a plano-concave lens where the image side face of this ninth lens $L_9$ is a concave surface facing the image side on a paraxial line.

In Embodiment 6, the optical length L with respect to the focal distance f=1.00 mm is 1.228 mm, and the back focus bf is 0.399 mm.

Figure 24:
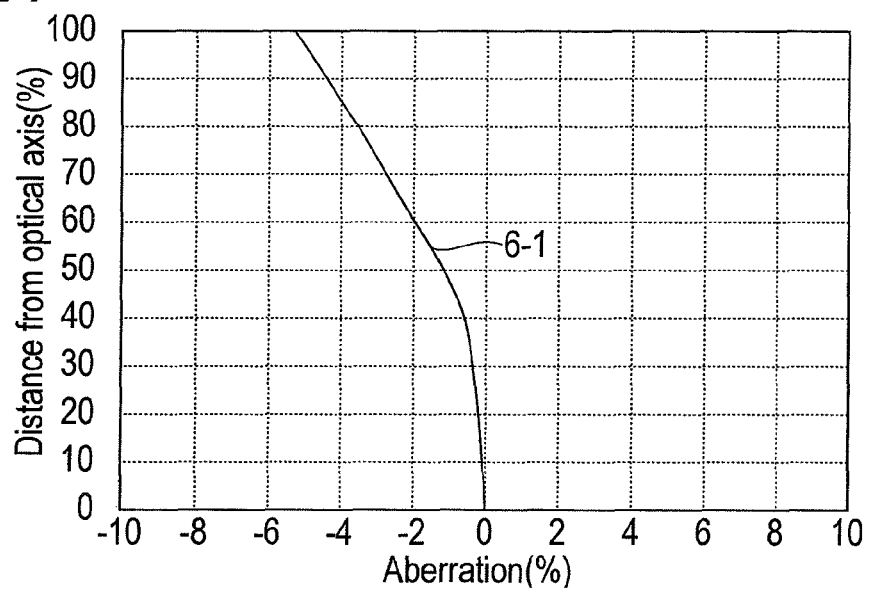
FIG. 24 is a diagram depicting the distortion aberration of the imaging lens of Embodiment 6.
Figure 25:
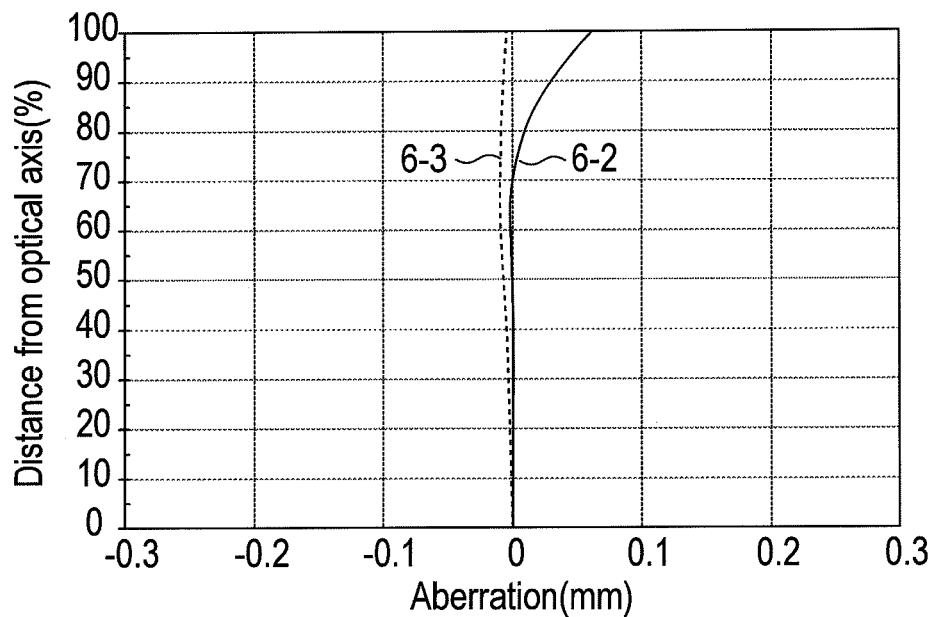
FIG. 25 is a diagram depicting the astigmatism aberration of the imaging lens of Embodiment 6.
Figure 26:
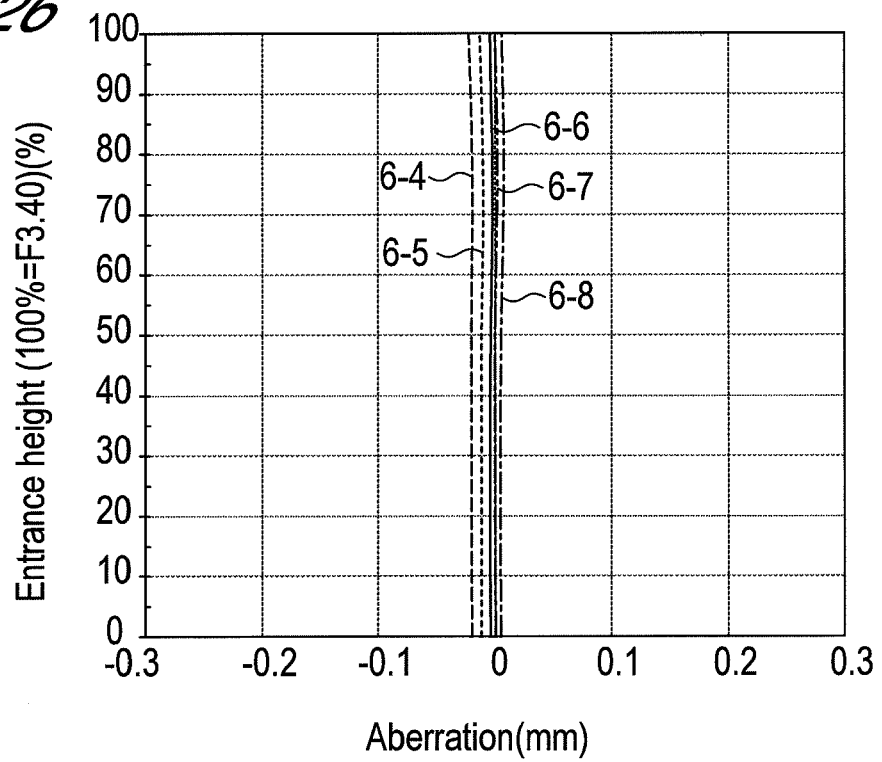
FIG. 26 is a diagram depicting the chromatic/spherical aberration of the imaging lens of Embodiment 6.

FIG. 24 shows a graph of the distortion aberration curve 6-1, FIG. 25 shows a graph of the astigmatism aberration curve (aberration curve 6-2 on the meridional surface and aberration curve 6-3 on the sagittal surface), and FIG. 26 shows a graph of a chromatic/spherical aberration curve (aberration curve 6-4 on g-line, aberration curve 6-5 on F-line, aberration curve 6-6 on e-line, aberration curve 6-7 on d-line, and aberration curve 6-8 on C-line).

The ordinates of the aberration curves in FIG. 24 and FIG. 25 show the image height by a % of the distance from the optical axis. In FIG. 24 and FIG. 25, 100% corresponds to 0.586 mm. The ordinate of the aberration curve in FIG. 26 shows the entrance height h (F number), and the maximum thereof corresponds to 3.40. The abscissa of FIG. 24 shows the aberration (%), and the abscissa of FIG. 25 and FIG. 26 show the value of the aberration (mm).

For the distortion aberration, the absolute value of the aberration is 5.25%, which is the maximum, at the position of 100% image height (image height: 0.586 mm), and the absolute value of the aberration is within 5.25% in a range where the image height is 0.586 mm or less.

For the astigmatism aberration, the absolute value of the aberration on the meridional surface is 0.0616 mm, which is the maximum, at the position of 100% image height (image height: 0.586 mm), and the absolute value of the aberration is within 0.0616 mm in a range where the image height is 0.586 mm or less.

For the chromatic/spherical aberration, the absolute value of the aberration curve 6-4 on the g-line is 0.0225 mm, which is the maximum, at 100% entrance height h, and the absolute value of the aberration is within 0.0225 mm.

Therefore according to the imaging lens of Embodiment 6, the optical length can be short enough to be installed in a portable telephone, the back focus can be long enough to insert such components as a filter and covering glass between the imaging lens and the image sensing plane, and good images can be acquired.

The difference of the imaging lens of Embodiment 6 from the imaging lenses of the above mentioned Embodiment 1 to Embodiment 5 is that the second lens $L_2$, the fifth lens $L_5$ and the eighth lens $L_8$ are formed of a curable resin material, that is transparent high hardness silicone resin. The first junction type compound lens 14 constituting the imaging lens of Embodiment 6 is formed by contacting a liquid type resin material to the second lens $L_2$ formed of a curable resin material, and solidifying, that is curing this curable resin material, so that the first lens $L_1$ or the third lens $L_3$ is bonded to the second lens $L_2$ (direct bonding). The second junction type compound lens 16 is formed by contacting a liquid type curable resin material to the fifth lens $L_5$ formed of a curable resin material, and solidifying, that is curing this curable resin material, so that the fourth lens $L_4$, or the sixth lens $L_6$ is bonded to the fifth lens $L_5$ (direct bonding). The third junction type compound lens 18 is formed by contacting a liquid type curable resin material to the eighth lens $L_8$ formed of a curable resin material, and solidifying, that is curing this curable resin material, so that the seventh lens $L_7$ or the ninth lens $L_9$ is bonded to the eighth lens $L_8$ (direct bonding).

It is also possible that an optical-parallel plate is formed by a curable resin material, just like the case of the second lens $L_2$ formed of an optical glass, and using this optical-parallel plate as the second lens $L_2$, the first lens $L_1$, or the third lens $L_3$ formed of a curable resin material, and this second lens $L_2$ are indirectly bonded. It is also possible that an optical-parallel plate is formed of a curable resin material, just like the case of the fifth lens $L_5$ formed of an optical glass, using this optical-parallel plate as the fifth lens $L_5$, and the fourth lens $L_4$ or the sixth lens $L_6$ formed of a curable resin material, and this fifth lens $L_5$, are indirectly bonded. It is also possible that an optical-parallel plate is formed of a curable resin material, just like the case of the eighth lens $L_8$ formed of an optical glass, and using this optical-parallel plate as the eighth lens $L_8$, the seventh lens $L_7$ or the ninth lens $L_9$ formed of a curable resin material, and this eighth lens $L_8$, are indirectly bonded.

As the description on the imaging lenses according to Embodiment 1 to Embodiment 6 show, the problem to be solved by this invention is solved by designing each composing lens of the imaging lens so as to satisfy the above Expression (1) to (12). In other words, an imaging lens where various aberrations are well corrected, sufficient back focus is acquired, and optical length is maintained short, can be acquired.

As described above, the imaging lens of the present invention is suitable not only for a lens for a camera built into a portable telephone, personal computer or digital camera, but also for a lens for a camera built into a personal digital assistant (PDA), a lens for a camera built into a toy having an image recognition function, and a lens for a camera built into monitoring, inspection or crime prevention equipment.

The invention claimed is:

1. An imaging lens, comprising a first junction type compound lens, an aperture stop, a second junction type compound lens, and a third junction type compound lens, characterized in that said first junction type compound lens, said aperture stop, said second junction type compound lens, and said third junction type compound lens are arranged in this sequence from an object side to an image side, said first junction type compound lens comprises a first lens, a second lens and a third lens arranged in this sequence from the object side to the image side, said second junction type compound lens comprises a fourth lens, a fifth lens and a sixth lens arranged in this sequence from the object side to the image side, said third junction type compound lens comprises a seventh lens, an eighth lens and a ninth lens arranged in this sequence from the object side to the image side, said first lens, said third lens, said fourth lens, said sixth lens, said seventh lens and said ninth lens are formed of a curable resin material, said second lens, said fifth lens and said eighth lens are formed of a high softening temperature optical glass material, said first lens and said second lens are bonded with adhesive, said second lens and said third lens are bonded with adhesive, said fourth lens and said fifth lens are bonded with adhesive, said fifth lens and said sixth lens are bonded with adhesive, said seventh lens and said eighth lens are bonded with adhesive, and said eighth lens and said ninth lens are bonded with adhesive, and the following Conditions (1) to (12) are satisfied:

$$0 \leq |N_2 - N_1| \leq 0.1 \quad (1)$$

$$0 \leq |N_2 - N_3| \leq 0.1 \quad (2)$$

$$0 \leq |\nu_2 - \nu_1| \leq 30.0 \quad (3)$$

$$0 \leq |\nu_2 - \nu_3| \leq 30.0 \quad (4)$$

$$0 \leq |N_5 - N_4| \leq 0.1 \quad (5)$$

$$0 \leq |N_5 - N_6| \leq 0.1 \quad (6)$$

$$0 \leq |\nu_5 - \nu_4| \leq 30.0 \quad (7)$$

$$0 \leq |\nu_5 - \nu_6| \leq 30.0 \quad (8)$$

$$0 \leq |N_8 - N_7| \leq 0.1 \quad (9)$$

$$0 \leq |N_8 - N_9| \leq 0.1 \quad (10)$$

$$0 \leq |\nu_8 - \nu_7| \leq 30.0 \quad (11)$$

$$0 \leq |\nu_8 - \nu_9| \leq 30.0 \quad (12)$$

where
$N_1$: refractive index of said first lens
$N_2$: refractive index of said second lens
$N_3$: refractive index of said third lens
$\nu_1$: Abbe number of said first lens
$\nu_2$: Abbe number of said second lens
$\nu_3$: Abbe number of said third lens
$N_4$: refractive index of said fourth lens
$N_5$: refractive index of said fifth lens
$N_6$: refractive index of said sixth lens
$\nu_4$: Abbe number of said fourth lens
$\nu_5$: Abbe number of said fifth lens
$\nu_6$: Abbe number of said sixth lens
$N_7$: refractive index of said seventh lens
$N_8$: refractive index of said eighth lens
$N_9$: refractive index of said ninth lens
$\nu_7$: Abbe number of said seventh lens
$\nu_8$: Abbe number of said eighth lens
$\nu_9$: Abbe number of said ninth lens.

2. The imaging lens according to claim 1, characterized in that
said second lens is an optical-parallel plate,
said first lens is a piano-convex lens where the object side face of said first lens is a convex surface facing the object side on a paraxial line,
said third lens is a piano-concave lens where the image side face of said third lens is a concave surface facing the image side on a paraxial line,
said fifth lens is an optical-parallel plate,
said fourth lens is a piano-concave lens where the object side face of said fourth lens is a concave surface facing the object side on a paraxial line,
said sixth lens is a piano-convex lens where the image side face of said sixth lens is a convex surface facing the image side on a paraxial line,
said eighth lens is an optical-parallel plate,
said seventh lens is a piano-convex lens where the object side face of said seventh lens is a convex surface facing the object side on a paraxial line, and
said ninth lens is a piano-concave lens where the image side face of said ninth lens is a concave surface facing the image side on a paraxial line.

3. The imaging lens according to claim 1, characterized in that
said second lens is a meniscus lens of which convex surface faces the object side,
said first lens is a lens where the object side face of said first lens is a convex surface facing the object side on a paraxial line,
said third lens is a lens where the image side face of said third lens is a concave surface facing the image side on a paraxial line,
said fifth lens is a meniscus lens of which convex surface faces the image side,
said fourth lens is a lens where the object side face of said fourth lens is a concave surface facing the object side on a paraxial line,
said sixth lens is a lens where the image side face of said sixth lens is a convex surface facing the image side on a paraxial line,
said eighth lens is a biconvex lens of which both side faces are convex surfaces,
said seventh lens is a lens where the object side face of said seventh lens is a convex surface facing the object side on a paraxial line, and
said ninth lens is a lens where the image side face of said ninth lens is a concave surface facing the image side on a paraxial line.

4. The imaging lens according to claim 1, characterized in that
the object side face of said first lens, the image side face of said third lens, the object side face of said fourth lens, the image side face of said sixth lens, the object side face of said seventh lens, and the image side face of said ninth lens are aspherical.

5. The imaging lens according to claim 1, characterized in that
both surfaces of said second lens, both surfaces of said fifth lens, and both surfaces of said eight lens, a total of six surfaces, are coating-processed.

6. The imaging lens according to claim 1, characterized in that said curable resin material is a transparent curable silicone resin.

7. An imaging lens, comprising an aperture stop (first stop), a first junction type compound lens, a second stop, a second junction type compound lens, and a third junction type compound lens, characterized in that
said aperture stop, said first junction type compound lens, said second stop, said second junction type compound lens, and said third junction type compound lens are arranged in this sequence from an object side to an image side,
said first junction type compound lens comprises a first lens, a second lens, and a third lens arranged in this sequence from the object side to the image side,
said second junction type compound lens comprises a fourth lens, a fifth lens and a sixth lens arranged in this sequence from the object side to the image side,
said third junction type compound lens comprises a seventh lens, an eighth lens and a ninth lens arranged in this sequence from the object side to the image side,
said first lens, said third lens, said fourth lens, said sixth lens, said seventh lens and said ninth lens are formed of a curable resin material, said second lens, said fifth lens and said eighth lens are formed of a high softening temperature optical glass material, said first lens and said second lens are bonded with adhesive, said second lens and said third lens are bonded with adhesive, said fourth lens and said fifth lens are bonded with adhesive, said fifth lens and said sixth lens are bonded with adhesive, said seventh lens and said eighth lens are bonded with adhesive, and said eighth lens and said ninth lens are bonded with adhesive, and the following Conditions (1) to (12) are satisfied:

$$0 \leq |N_2 - N_1| \leq 0.1 \quad (1)$$

$$0 \leq |N_2 - N_3| \leq 0.1 \quad (2)$$

$$0 \leq |\nu_2 - \nu_1| \leq 30.0 \quad (3)$$

$$0 \leq |\nu_2 - \nu_3| \leq 30.0 \quad (4)$$

$$0 \leq |N_5 - N_4| \leq 0.1 \quad (5)$$

$$0 \leq |N_5 - N_6| \leq 0.1 \quad (6)$$

$$0 \leq |\nu_5 - \nu_4| \leq 30.0 \quad (7)$$

$$0 \leq |\nu_5 - \nu_6| \leq 30.0 \quad (8)$$

$$0 \leq |N_8 - N_7| \leq 0.1 \quad (9)$$

$$0 \leq |N_8 - N_9| \leq 0.1 \quad (10)$$

$$0 \leq |\nu_8 - \nu_7| \leq 30.0 \quad (11)$$

$$0 \leq |\nu_8 - \nu_9| \leq 30.0 \quad (12)$$

where
- $N_1$: refractive index of said first lens
- $N_2$: refractive index of said second lens
- $N_3$: refractive index of said third lens
- $\nu_1$: Abbe number of said first lens
- $\nu_2$: Abbe number of said second lens
- $\nu_3$: Abbe number of said third lens
- $N_4$: refractive index of said fourth lens
- $N_5$: refractive index of said fifth lens
- $N_6$: refractive index of said sixth lens
- $\nu_4$: Abbe number of said fourth lens
- $\nu_5$: Abbe number of said fifth lens
- $\nu_6$: Abbe number of said sixth lens
- $N_7$: refractive index of said seventh lens
- $N_8$: refractive index of said eighth lens
- $N_9$: refractive index of said ninth lens
- $\nu_7$: Abbe number of said seventh lens
- $\nu_8$: Abbe number of said eighth lens
- $\nu_9$: Abbe number of said ninth lens.

8. The imaging lens according to claim 7, characterized in that said second lens is an optical-parallel plate,
said first lens is a piano-convex lens where the object side face of said first lens is a convex surface facing the object side on a paraxial line,
said third lens is a piano-convex lens where the image side face of said third lens is a convex surface facing the image side on a paraxial line,
said fifth lens is an optical-parallel plate,
said fourth lens is a piano-concave lens where the object side face of said fourth lens is a concave surface facing the object side on a paraxial line,
said sixth lens is a piano-convex lens where the image side face of said sixth lens is a convex surface facing the image side on a paraxial line,
said eighth lens is an optical-parallel plate,
said seventh lens is a piano-convex lens where the object side face of said seventh lens is a convex surface facing the object side on a paraxial line, and
said ninth lens is a piano-concave lens where the image side face of said ninth lens is a concave surface facing the image side on a paraxial line.

9. The imaging lens according to claim 7, characterized in that said second lens is a biconvex lens of which both side faces are convex surfaces,
said first lens is a lens where the object side face of said first lens is a convex surface facing the object side on a paraxial line,
said third lens is a lens where the image side face of said third lens is a convex surface facing the image side on a paraxial line,
said fifth lens is a meniscus lens of which convex surface faces the image side,
said fourth lens is a lens where the object side face of said fourth lens is a concave surface facing the object side on a paraxial line,
said sixth lens is a lens where the image side face of said sixth lens is a convex surface facing the image side on a paraxial line,
said eighth lens is a meniscus lens of which convex surface faces the image side,
said seventh lens is a lens where the object side face of said seventh lens is a convex surface facing the object side on a paraxial line, and
said ninth lens is a lens where the image side face of said ninth lens is a concave surface facing the image side on a paraxial line.

10. The imaging lens according to claim 7, characterized in that the object side face of said first lens, the image side face of said third lens, the object side face of said fourth lens, the image side face of said sixth lens, the object side face of said seventh lens, and the image side face of said ninth lens are aspherical.

11. The imaging lens according to claim 7, characterized in that both surfaces of said second lens, both surfaces of said fifth lens, and both surfaces of said eight lens, a total of six surfaces, are coating-processed.

12. The imaging lens according to claim 7, characterized in that said curable resin material is a transparent curable silicone resin.

13. An imaging lens, comprising a first junction type compound lens, an aperture stop, a second junction type compound lens, and a third junction type compound lens, characterized in that said first junction type compound lens, said aperture stop, said second junction type compound lens, and said third junction type compound lens are arranged in this sequence from an object side to an image side,
said first junction type compound lens comprises a first lens, a second lens and a third lens arranged in this sequence from the object side to the image side,
said second junction type compound lens comprises a fourth lens, a fifth lens and a sixth lens arranged in this sequence from the object side to the image side, said third junction type compound lens comprises a seventh lens, an eighth lens and a ninth lens arranged in this sequence from the object side to the image side, said first lens, said second lens, said third lens, said fourth lens, said fifth lens, said sixth lens, said seventh lens, said eighth lens and said ninth lens are formed of a curable resin material, said first lens and said second lens are directly bonded, said second lens and said third lens are directly bonded, said fourth lens and said fifth lens are directly bonded, said fifth lens and said sixth lens are directly bonded, said seventh lens and said eighth lens are directly bonded, and said eighth lens and said ninth lens are directly bonded, and the following Conditions (1) to (12) are satisfied:

$$0 \leq |N_2 - N_1| \leq 0.1 \quad (1)$$

$$0 \leq |N_2 - N_3| \leq 0.1 \quad (2)$$

$$0 \leq |\nu_2 - \nu_1| \leq 30.0 \quad (3)$$

$$0 \leq |\nu_2 - \nu_3| \leq 30.0 \quad (4)$$

$$0 \leq |N_5 - N_4| \leq 0.1 \quad (5)$$

$$0 \leq |N_5 - N_6| \leq 0.1 \quad (6)$$

$$0 \leq |\nu_5 - \nu_4| \leq 30.0 \quad (7)$$

$$0 \leq |\nu_5 - \nu_6| \leq 30.0 \quad (8)$$

$$0 \leq |N_8 - N_7| \leq 0.1 \quad (9)$$

$$0 \leq |N_8 - N_9| \leq 0.1 \quad (10)$$

$$0 \leq |\nu_8 - \nu_7| \leq 30.0 \quad (11)$$

$$0 \leq |\nu_8 - \nu_9| \leq 30.0 \quad (12)$$

where
$N_1$: refractive index of said first lens
$N_2$: refractive index of said second lens
$N_3$: refractive index of said third lens
$\nu_1$: Abbe number of said first lens
$\nu_2$: Abbe number of said second lens
$\nu_3$: Abbe number of said third lens
$N_4$: refractive index of said fourth lens
$N_5$: refractive index of said fifth lens
$N_6$: refractive index of said sixth lens
$\nu_4$: Abbe number of said fourth lens
$\nu_5$: Abbe number of said fifth lens
$\nu_6$: Abbe number of said sixth lens
$N_7$: refractive index of said seventh lens
$N_8$: refractive index of said eighth lens
$N_9$: refractive index of said ninth lens
$\nu_7$: Abbe number of said seventh lens
$\nu_8$: Abbe number of said eighth lens
$\nu_9$: Abbe number of said ninth lens.

14. The imaging lens according to claim 13, characterized in that said second lens is an optical-parallel plate, said first lens is a piano-convex lens where the object side face of said first lens is a convex surface facing the object side on a paraxial line, said third lens is a piano-concave lens where the image side face of said third lens is a concave surface facing the image side on a paraxial line, said fifth lens is an optical-parallel plate, said fourth lens is a piano-concave lens where the object side face of said fourth lens is a concave surface facing the object side on a paraxial line, said sixth lens is a piano-convex lens where the image side face of said sixth lens is a convex surface facing the image side on a paraxial line, said eighth lens is an optical-parallel plate, said seventh lens is a piano-convex lens where the object side face of said seventh lens is a convex surface facing the object side on a paraxial line, and said ninth lens is a piano-concave lens where the image side face of said ninth lens is a concave surface facing the image side on a paraxial line.

15. The imaging lens according to claim 13, characterized in that the object side face of said first lens, the image side face of said third lens, the object side face of said fourth lens, the image side face of said sixth lens, the object side face of said seventh lens, and the image side face of said ninth lens are aspherical.

16. The imaging lens according to claim 13, characterized in that said curable resin material is a transparent curable silicone resin.

17. An imaging lens, comprising a first junction type compound lens, an aperture stop, a second junction type compound lens, a third junction type compound lens, characterized in that said first junction type compound lens, said aperture stop, said second junction type compound lens, and said third junction type compound lens are arranged in this sequence from an object side to an image side, said first junction type compound lens comprises a first lens, a second lens and a third lens arranged in this sequence from the object side to the image side, said second junction type compound lens comprises a fourth lens, a fifth lens and a sixth lens arranged in this sequence from the object side to the image side, said third junction type compound lens comprises a seventh lens, an eighth lens and a ninth lens arranged in this sequence from the object side to the image side, said first lens, said second lens, said third lens, said fourth lens, said fifth lens, said sixth lens, said seventh lens, said eighth lens and said ninth lens are formed of a curable resin material, said first lens and said second lens are bonded with adhesive, said second lens and said third lens are bonded with adhesive, said fourth lens and said fifth lens are bonded with adhesive, said fifth lens and said sixth lens are bonded with adhesive, said seventh lens and said eighth lens are bonded with adhesive, and said eighth lens and said ninth lens are bonded with adhesive, and the following Conditions (1) to (12) are satisfied:

$$0 \leq |N_2 - N_1| \leq 0.1 \quad (1)$$

$$0 \leq |N_2 - N_3| \leq 0.1 \quad (2)$$

$$0 \leq |\nu_2 - \nu_1| \leq 30.0 \quad (3)$$

$$0 \leq |\nu_2 - \nu_3| \leq 30.0 \quad (4)$$

$$0 \leq |N_5 - N_4| \leq 0.1 \quad (5)$$

$$0 \leq |N_5 - N_6| \leq 0.1 \quad (6)$$

$$0 \leq |\nu_5 - \nu_4| \leq 30.0 \quad (7)$$

$$0 \leq |\nu_5 - \nu_6| \leq 30.0 \quad (8)$$

$$0 \leq |N_8-N_7| \leq 0.1 \quad (9)$$

$$0 \leq |N_8-N_9| \leq 0.1 \quad (10)$$

$$0 \leq |v_8-v_7| \leq 30.0 \quad (11)$$

$$0 \leq |v_8-v_9| \leq 30.0 \quad (12)$$

where
- $N_1$: refractive index of said first lens
- $N_2$: refractive index of said second lens
- $N_3$: refractive index of said third lens
- $v_1$: Abbe number of said first lens
- $v_2$: Abbe number of said second lens
- $v_3$: Abbe number of said third lens
- $N_4$: refractive index of said fourth lens
- $N_5$: refractive index of said fifth lens
- $N_6$: refractive index of said sixth lens
- $v_4$: Abbe number of said fourth lens
- $v_5$: Abbe number of said fifth lens
- $v_6$: Abbe number of said sixth lens
- $N_7$: refractive index of said seventh lens
- $N_8$: refractive index of said eighth lens
- $N_9$: refractive index of said ninth lens
- $v_7$: Abbe number of said seventh lens
- $v_8$: Abbe number of said eighth lens
- $v_9$: Abbe number of said ninth lens.

18. The imaging lens according to claim 17, characterized in that
said second lens is an optical-parallel plate,
said first lens is a piano-convex lens where the object side face of said first lens is a convex surface facing the object side on a paraxial line,
said third lens is a piano-concave lens where the image side face of said third lens is a concave surface facing the image side on a paraxial line,
said fifth lens is an optical-parallel plate,
said fourth lens is a piano-concave lens where the object side face of said fourth lens is a concave surface facing the object side on a paraxial line,
said sixth lens is a piano-convex lens where the image side face of said sixth lens is a convex surface facing the image side on a paraxial line,
said eighth lens is an optical-parallel plate,
said seventh lens is a piano-convex lens where the object side face of said seventh lens is a convex surface facing the object side on a paraxial line, and
said ninth lens is a piano-concave lens where the image side face of said ninth lens is a concave surface facing the image side on a paraxial line.

19. The imaging lens according to claim 17, characterized in that
the object side face of said first lens, the image side face of said third lens, the object side face of said fourth lens, the image side face of said sixth lens, the object side face of said seventh lens, and the image side face of said ninth lens are aspherical.

20. The imaging lens according to claim 17, characterized in that
both surfaces of said second lens, both surfaces of said fifth lens, and both surfaces of said eight lens, a total of six surfaces, are coating-processed.

21. The imaging lens according to claim 17, characterized in that said curable resin material is a transparent curable silicone resin.

* * * * *